United States Patent
Hemingway et al.

(10) Patent No.: US 9,511,544 B2
(45) Date of Patent: Dec. 6, 2016

(54) METHOD OF MAKING FASTENERS BY THREE-DIMENSIONAL PRINTING

(71) Applicant: A. RAYMOND ET CIE, Grenoble (FR)

(72) Inventors: Todd L. Hemingway, Metamora, MI (US); Walter B. Pipp, Jr., Birmingham, MI (US); Todd Murray, Gaines, MI (US); Nicholas Jackson, Davisburg, MI (US); Jason F. Reznar, Redford, MI (US); Jimmy Voniez, Royal Oak, MI (US)

(73) Assignee: A. Raymond et Cie, Grenoble (FR)

( * ) Notice: Subject to any disclaimer, the term of this patent is extended or adjusted under 35 U.S.C. 154(b) by 205 days.

(21) Appl. No.: 14/092,101

(22) Filed: Nov. 27, 2013

(65) Prior Publication Data
US 2014/0086704 A1 Mar. 27, 2014

Related U.S. Application Data

(63) Continuation of application No. PCT/US2012/039445, filed on May 24, 2012.
(Continued)

(51) Int. Cl.
*B29C 35/08* (2006.01)
*B29C 41/02* (2006.01)
(Continued)

(52) U.S. Cl.
CPC ......... *B29C 67/007* (2013.01); *B29C 67/0051* (2013.01); *B29C 67/0055* (2013.01); *F16B 5/065* (2013.01); *F16B 5/0642* (2013.01); *F16B 19/002* (2013.01); *F16B 19/1081* (2013.01); *F16B 29/00* (2013.01); *F16B 33/006* (2013.01); *F16B 37/00* (2013.01); *H02G 3/32* (2013.01);
(Continued)

(58) Field of Classification Search
CPC .......... B29C 35/08; B29C 41/02; B29C 41/50; B29C 67/0055; B29C 67/0059; B29C 67/0062; B29C 67/0066; B29C 67/0081; B29C 71/00; B29C 71/02; B29C 71/04; B29D 1/00
USPC .................. 264/113, 236, 297.1, 297.8, 308, 401,264/460, 461, 462, 463, 494, 496, 497
See application file for complete search history.

(56) References Cited

U.S. PATENT DOCUMENTS 3,076,208 A 2/1963 Moore
3,466,966 A 9/1969 Brown
(Continued)

FOREIGN PATENT DOCUMENTS

DE 102006062373 A1 6/2008
EP 0490546 A1 6/1992
(Continued)

OTHER PUBLICATIONS

M. Bonomo, Diamond Fasteners, Diamond Fasteners Blog; "Can 3-D Printing Be Used for NAS Screws?;" http://www.diamondfasteners.com/blog/bid/326572/Can-3-D-printing-Be-Used-for-NAS . . . (published Nov. 27, 2013); 2 pages.
(Continued)

*Primary Examiner* — Leo B Tentoni

(57) ABSTRACT

A fastener is provided. In another aspect, a fastener is made of layers of material, a light curable material and/or multiple built-up materials. Another aspect uses a three-dimensional printing machine to emit material from an ink jet printing head to build up a fastener.

32 Claims, 24 Drawing Sheets

Related U.S. Application Data

(60) Provisional application No. 61/492,503, filed on Jun. 2, 2011.

(51) Int. Cl.

| | | |
|---|---|---|
| *B29C 41/50* | (2006.01) | |
| *B29D 1/00* | (2006.01) | |
| *B29C 67/00* | (2006.01) | |
| *F16B 19/10* | (2006.01) | |
| *F16B 29/00* | (2006.01) | |
| *F16B 33/00* | (2006.01) | |
| *H02G 3/32* | (2006.01) | |
| *F16B 19/00* | (2006.01) | |
| *F16B 37/00* | (2006.01) | |
| *B29L 31/00* | (2006.01) | |
| *F16B 5/02* | (2006.01) | |
| *F16B 5/06* | (2006.01) | |
| *F16B 7/04* | (2006.01) | |
| *F16B 37/04* | (2006.01) | |
| *F16B 37/08* | (2006.01) | |
| *F16B 39/30* | (2006.01) | |

(52) U.S. Cl.
CPC ........ *B29L 2031/727* (2013.01); *F16B 5/0233* (2013.01); *F16B 5/0635* (2013.01); *F16B 7/0493* (2013.01); *F16B 37/041* (2013.01); *F16B 37/0842* (2013.01); *F16B 39/30* (2013.01)

(56) References Cited

U.S. PATENT DOCUMENTS

| | | |
|---|---|---|
| 4,125,917 A | 11/1978 | Andre |
| 4,261,243 A | 4/1981 | Palmer |
| 4,296,949 A | 10/1981 | Muetterties et al. |
| 4,334,814 A | 6/1982 | McKewan |
| 4,358,080 A | 11/1982 | Wolker |
| 4,402,118 A | 9/1983 | Benedetti |
| 4,403,895 A | 9/1983 | Caldwell et al. |
| 4,408,939 A | 10/1983 | Graff et al. |
| 4,508,477 A | 4/1985 | Oehlke et al. |
| 4,575,330 A | 3/1986 | Hull |
| 4,614,321 A | 9/1986 | Andre |
| 4,770,582 A | 9/1988 | Junemann et al. |
| 4,900,210 A | 2/1990 | Buchanan et al. |
| 5,098,242 A | 3/1992 | Schaty |
| 5,102,276 A | 4/1992 | Gourd |
| 5,106,324 A | 4/1992 | Natsume |
| 5,143,817 A | 9/1992 | Lawton et al. |
| 5,168,604 A | 12/1992 | Boville |
| 5,217,337 A | 6/1993 | Junemann et al. |
| 5,256,018 A | 10/1993 | Rattmann et al. |
| 5,273,383 A | 12/1993 | Hughes |
| 5,306,098 A | 4/1994 | Lewis |
| 5,316,245 A | 5/1994 | Ruckwardt |
| 5,324,151 A | 6/1994 | Szudarek et al. |
| 5,328,752 A | 7/1994 | Miyazato |
| 5,337,983 A | 8/1994 | Mailey |
| 5,401,905 A | 3/1995 | Lesser et al. |
| 5,468,108 A | 11/1995 | Sullivan et al. |
| 5,503,785 A | 4/1996 | Crump et al. |
| 5,505,411 A | 4/1996 | Heaton et al. |
| 5,599,149 A | 2/1997 | Clemente |
| 5,617,911 A | 4/1997 | Sterett et al. |
| 5,647,931 A | 7/1997 | Retallick et al. |
| 5,655,927 A | 8/1997 | Maue et al. |
| 5,658,412 A | 8/1997 | Retallick et al. |
| 5,718,025 A | 2/1998 | Courtin |
| 5,829,937 A | 11/1998 | Morello et al. |
| 5,837,172 A | 11/1998 | Pritchard et al. |
| 5,866,058 A | 2/1999 | Batchelder et al. |
| 5,905,231 A | 5/1999 | Houte et al. |
| 5,906,465 A | 5/1999 | Sato et al. |
| 5,921,510 A | 7/1999 | Benoit et al. |
| 5,941,740 A | 8/1999 | Neuer et al. |
| 5,971,688 A | 10/1999 | Anstett |
| 5,980,230 A | 11/1999 | Dowd et al. |
| 6,102,639 A | 8/2000 | DiStasio |
| 6,116,832 A | 9/2000 | Wolf et al. |
| 6,259,962 B1 | 7/2001 | Gothait |
| 6,274,813 B1 | 8/2001 | Houte et al. |
| 6,315,510 B1 | 11/2001 | Sturies et al. |
| 6,336,779 B1 | 1/2002 | Jakob et al. |
| 6,338,602 B1 | 1/2002 | Gombert |
| 6,467,650 B1 | 10/2002 | Lesser et al. |
| 6,514,024 B2 | 2/2003 | Akema et al. |
| 6,536,807 B1 | 3/2003 | Raymond et al. |
| 6,565,049 B2 | 5/2003 | Hahn |
| 6,569,373 B2 | 5/2003 | Napadensky |
| 6,585,196 B2 | 7/2003 | Nakanishi |
| 6,616,216 B2 | 9/2003 | Furuyama et al. |
| 6,644,763 B1 | 11/2003 | Gothait |
| 6,644,902 B1 | 11/2003 | Cutshall |
| 6,658,314 B1 | 12/2003 | Gothait |
| 6,669,150 B2 | 12/2003 | Benoit et al. |
| 6,726,417 B2 | 4/2004 | Kanie |
| 6,758,645 B2 | 7/2004 | Curley, Jr. et al. |
| 6,809,257 B2 | 10/2004 | Shibuya |
| 6,850,334 B1 | 2/2005 | Gothait |
| 6,896,839 B2 | 5/2005 | Kubo et al. |
| 6,976,292 B2 | 12/2005 | MacPherson et al. |
| 7,021,875 B2 | 4/2006 | Yake et al. |
| 7,036,775 B2 | 5/2006 | Nakanishi |
| 7,048,486 B2 | 5/2006 | Schäty |
| 7,073,230 B2 | 7/2006 | Boville |
| 7,086,630 B2 | 8/2006 | Maruyama |
| 7,114,221 B2 | 10/2006 | Gibbons et al. |
| 7,125,512 B2 | 10/2006 | Crump et al. |
| 7,172,161 B2 | 2/2007 | Rosemann et al. |
| 7,179,038 B2 | 2/2007 | Reindl |
| 7,182,563 B2 | 2/2007 | Wimmer et al. |
| 7,183,335 B2 | 2/2007 | Napadensky |
| 7,188,393 B2 | 3/2007 | Kawai |
| 7,192,231 B2 | 3/2007 | Blackaby |
| 7,207,759 B2 | 4/2007 | Kato |
| 7,220,380 B2 | 5/2007 | Farr et al. |
| 7,225,045 B2 | 5/2007 | Gothait et al. |
| 7,226,260 B2 | 6/2007 | Jackson, Jr. et al. |
| 7,255,521 B2 | 8/2007 | Yake et al. |
| 7,255,821 B2 | 8/2007 | Priedeman, Jr. et al. |
| 7,278,190 B2 | 10/2007 | Fischer et al. |
| 7,300,619 B2 | 11/2007 | Napadensky et al. |
| 7,316,374 B2 | 1/2008 | Maruyama |
| 7,341,282 B2 | 3/2008 | Moretti et al. |
| 7,364,686 B2 | 4/2008 | Kritchman et al. |
| 7,369,915 B2 | 5/2008 | Kritchman et al. |
| 7,465,135 B2 | 12/2008 | Fritsch |
| 7,479,510 B2 | 1/2009 | Napadensky et al. |
| 7,481,474 B2 | 1/2009 | Higgins et al. |
| 7,481,647 B2 * | 1/2009 | Sambu ............... B29C 67/0066 264/113 |
| 7,500,846 B2 | 3/2009 | Eshed et al. |
| 7,503,528 B2 | 3/2009 | Adams et al. |
| 7,506,897 B2 | 3/2009 | Bauer |
| 7,533,852 B2 | 5/2009 | Stigler |
| 7,537,247 B2 | 5/2009 | Trede et al. |
| 7,562,420 B2 | 7/2009 | Kato |
| 7,593,214 B2 | 9/2009 | Lee |
| 7,594,985 B2 | 9/2009 | Yake et al. |
| 7,604,768 B2 | 10/2009 | Kritchman |
| 7,614,589 B2 | 11/2009 | Kato |
| 7,614,590 B2 | 11/2009 | Boville |
| 7,628,857 B2 | 12/2009 | Kritchman et al. |
| 7,658,976 B2 | 2/2010 | Kritchman |
| 7,669,807 B2 | 3/2010 | Stigler et al. |
| 7,685,694 B2 | 3/2010 | Zagagi et al. |
| 7,686,605 B2 | 3/2010 | Perret et al. |
| 7,690,876 B2 | 4/2010 | Kawai et al. |
| 7,713,048 B2 | 5/2010 | Perret et al. |
| 7,725,209 B2 | 5/2010 | Menchik et al. |
| 7,736,578 B2 | 6/2010 | Ederer |

(56) References Cited

U.S. PATENT DOCUMENTS

| | | | |
|---|---|---|---|
| 7,740,683 | B2 | 6/2010 | Thorsson et al. |
| 7,747,341 | B2 | 6/2010 | Dubois et al. |
| 7,753,320 | B2 | 7/2010 | Geiger et al. |
| 7,767,130 | B2 | 8/2010 | Elsner et al. |
| 7,770,266 | B2 | 8/2010 | Higgins et al. |
| 7,770,938 | B2 | 8/2010 | Bauer |
| 7,829,000 | B2 | 11/2010 | Farr et al. |
| 7,837,248 | B2 | 11/2010 | Nedelman |
| 7,851,122 | B2 | 12/2010 | Napadensky |
| 7,887,012 | B2 | 2/2011 | Desai et al. |
| 7,891,095 | B2 | 2/2011 | Jonsson et al. |
| 7,891,926 | B2 | 2/2011 | Jackson, Jr. |
| 2002/0171177 | A1 | 11/2002 | Kritchman et al. |
| 2003/0151167 | A1 | 8/2003 | Kritchman et al. |
| 2003/0180117 | A1 | 9/2003 | Niku |
| 2004/0067122 | A1 | 4/2004 | Post |
| 2004/0081530 | A1 | 4/2004 | Lee |
| 2004/0228700 | A1 | 11/2004 | Clinch et al. |
| 2005/0072113 | A1 | 4/2005 | Collins et al. |
| 2005/0095085 | A1 | 5/2005 | Winker |
| 2005/0098688 | A1 | 5/2005 | Miarka et al. |
| 2006/0176350 | A1 | 8/2006 | Howarth et al. |
| 2008/0052878 | A1 | 3/2008 | Lewis et al. |
| 2008/0211132 | A1 | 9/2008 | Feenstra |
| 2008/0237933 | A1 | 10/2008 | Hochsmann et al. |
| 2008/0282527 | A1 | 11/2008 | Beck et al. |
| 2009/0017219 | A1 | 1/2009 | Paasche et al. |
| 2009/0045553 | A1 | 2/2009 | Weidinger et al. |
| 2009/0133228 | A1 | 5/2009 | Werner et al. |
| 2009/0142619 | A1 | 6/2009 | Miyoshi |
| 2009/0190993 | A1 | 7/2009 | De Gelis |
| 2009/0191025 | A1 | 7/2009 | Jackson, Jr. |
| 2009/0263180 | A1 | 10/2009 | De Gelis |
| 2009/0304952 | A1 | 12/2009 | Kritchman |
| 2010/0009133 | A1 | 1/2010 | Chait |
| 2010/0098515 | A1 | 4/2010 | Raymond |
| 2010/0140430 | A1 | 6/2010 | Stigler et al. |
| 2010/0146747 | A1 | 6/2010 | Reznar et al. |
| 2010/0217429 | A1 | 8/2010 | Kritchman et al. |
| 2010/0270713 | A1 | 10/2010 | Frangov et al. |
| 2010/0294549 | A1 | 11/2010 | Laville et al. |
| 2011/0033260 | A1 | 2/2011 | Miura |
| 2011/0044782 | A1 | 2/2011 | Lange et al. |
| 2011/0074065 | A1 | 3/2011 | Batchelder et al. |
| 2011/0076495 | A1 | 3/2011 | Batchelder et al. |
| 2011/0076496 | A1 | 3/2011 | Batchelder et al. |
| 2011/0285052 | A1 | 11/2011 | Wigand et al. |
| 2012/0033002 | A1 | 2/2012 | Seeler et al. |
| 2012/0225408 | A1 | 9/2012 | Moore |
| 2013/0031753 | A1 | 2/2013 | Massoels |

FOREIGN PATENT DOCUMENTS

| | | |
|---|---|---|
| EP | 2156942 A1 | 2/2010 |
| FR | 2935031 A1 | 2/2010 |
| GB | 1208543 A | 10/1970 |
| GB | 1440062 A | 6/1976 |
| JP | H10119136 A | 5/1998 |

OTHER PUBLICATIONS

Internet Catalog Class Listing for Class Threaded Fastener Selection 215; "What is the definition of carriage bolt?;" Tooling University—SME; (published 2013); 4 pages.

"Make Your Ideas Real—Give Your Creativity a New Dimension, dimension 3D Printers," Stratasys; company brochure; (2010) 73 pages, Stratasys Document #204400-0002.

Brain, Marshall. "How Stereolithography 3-D Layering Works," HowStuffWorks.com.; http://www.howstuffworks.com/stereolith. htm; article, Oct. 5, 2000, 6 pages.

"Stereolithography," Wikipedia, http://en.wikipedia.org/wiki/Stereolithography; article, last modified Jun. 1, 2011, 5 pages.

"3D Printing," Wikipedia, http://en/wikipedia.org/wiki/3D_printing; article, last modified Jun. 20, 2011, 5 pages.

"Connex500, The First Multi-Material 3-Dimensional Printing System", Objet Geometries Ltd.; article, (2010), 2 pages.

"PolyJet Matrix™ Technology," Objet Geometries Ltd.; brochure, (2009), 6 pages.

"Automotive," Objet Geometries, Inc.; article, http://www.objet.com/INDUSTRIES/Automotive; Sep. 12, 2010, 1 page.

"Keeping AP Racing on Track," Objet Geometries Ltd.; printout, www.2objet.com, (2007), 2 pages.

"The Power of Two, Case Study," Objet Geometries Ltd.; printout, www.objet.com, (2010), 2 pages.

"A Factory on Your Desk,"; The Economist Technology Quarterly; article, Sep. 5, 2009, pp. 26-29.

Rao. M.; Webcourse publication IIT-Delhi/Computer Aided Design & Manufacturing II—Module G(4): Rapid Prototyping (Apr. 18, 2011).

"Consumer Goods", Case Study, Objet Geometries Ltd., printout, May 5, 2011, http://objet.com/Industries/consumer_Goods/.

"EOS in brief; e-Manufacturing Solutions", EOS Worldwide, brochure (2010).

"Direct metal laser sintering", Wikipedia, http://en.wikipedia.org/wiki/Direct_metal_laser_sintering, article, last modified Mar. 23, 2011, 3 pages.

Sprovieri, John, "Fastening: Christmas Trees Ain't Just for December", Assembly Magazine, downloaded from Internet on Aug. 5, 2011, http://www.assemblymag.com/Articles/Article_Rotation/BNP_GUID_9-5-2006_A_100000.

EOSINT S 750 product brochure, "Double laser-sintering system for the direct, tool-less production of sand cores and moulds for metal castings" downloaded from internet Apr. 1, 2011, http://img.directindustry.com/pdf/repository_di/5078/eosint-s-750-21926_1b.jpg.

EOS e-Manufacturing Solutions, brochure, EOS GmbH Electro Optical Systems, downloaded from internet Apr. 1, 2011, www.eos.info.

"Laser sintering—versatile production of tooling inserts, prototype parts and end products from metal powder", International Powder Metallurgy Directory, http://www.ipmd.net/articles/articles/001087.html, downloaded Apr. 1, 2011.

EOSINT M 280: "Laser-sintering system for the production of tooling inserts, prototype parts and end products directly in metal." Product brochure, EOS e-Manufacturing Solutions, downloaded from internet Apr. 1, 2011, http://www.eos.info/en/products/systems-equipment/metal-laser-sintering-systems.html.

"Digitalized e-Manufacturing workflows: Direct Metall Laser-Sintering technology enables high quality parts, cost efficiency and time savings", press release Mar. 22, 2011, EOS Electro Optical Systems GmbH, downloaded from internet Apr. 1, 2011, http://www.eos.info/en/news-events/press-relesases/pressdetails/article/103/digitalisier.html.

"Objet. The Power to Create. Jaguar Land Rover", 3Dprinting & Rapid Prototyping by Objet Geometries Ltd.; printout, <http://www.objet.com>/, May 31, 2011.

"Installation Instructions for Towel Bar", Danze (sold in U.S. prior to Jun. 2011).

"Hillman Fasteners 10 Pack #8 Zinc EZ Anchor 41408", downloaded from internet May 19, 2011: <http://www.thegreathardwarestore.com/Hillman-Fasteners-10-Pack-8-Zinc-EZ-Anchor-41408-p/848187.htm>.

"Hillman Fasteners 20 Pack #6 Plas EZ Anchor 41410", downloaded from internet May 19, 2011: <http://www.thegreathardwarestore.com/Hillman-Fasteners-20-Pack-6-Plas-EZ-Anchor-41410-p/848173.htm>.

EOS M 270 3TRPD Shown in Real Time—Machine and Scintering Pattern (published Apr. 1, 2011); pictures; 2 pages.

Evans, C.; "What is Rapid Prototyping?"; XP002681573; http://www.articlesbase.com/industrial-articles/what-is-rapid-prototyping-3699771.html; Nov. 11, 2010; 1 page.

Colton, Prof. J.S., "Bolt Manufacture: Process Selection", XP002681623, Georgia Institute of Technology, URL: www-old.me.gatech.edu/jonathan.colton/me4210/procselect1.pdf, 1999, pp. 1-37.

(56) References Cited

OTHER PUBLICATIONS

"TIXOS-Implants Line Manufactured by Titanium Powder Laser Microfusion", XP002681624, Smile Dental Journal, vol. 5, No. 3, Sep. 1, 2010, p. 56.
"3D printing The printed world", XP-002683243, http://www.economist.com/node/18114221/print, Feb. 10, 2011, 9 pages.
Leno, Jay; "Jay Leno's 3D Printer Replaces Rusty Old Parts," Popular Mechanics, http://www.popularmechanics.com/cars/jay-leno/technology/4320759, Jun. 8, 2009, 3 pages.

* cited by examiner

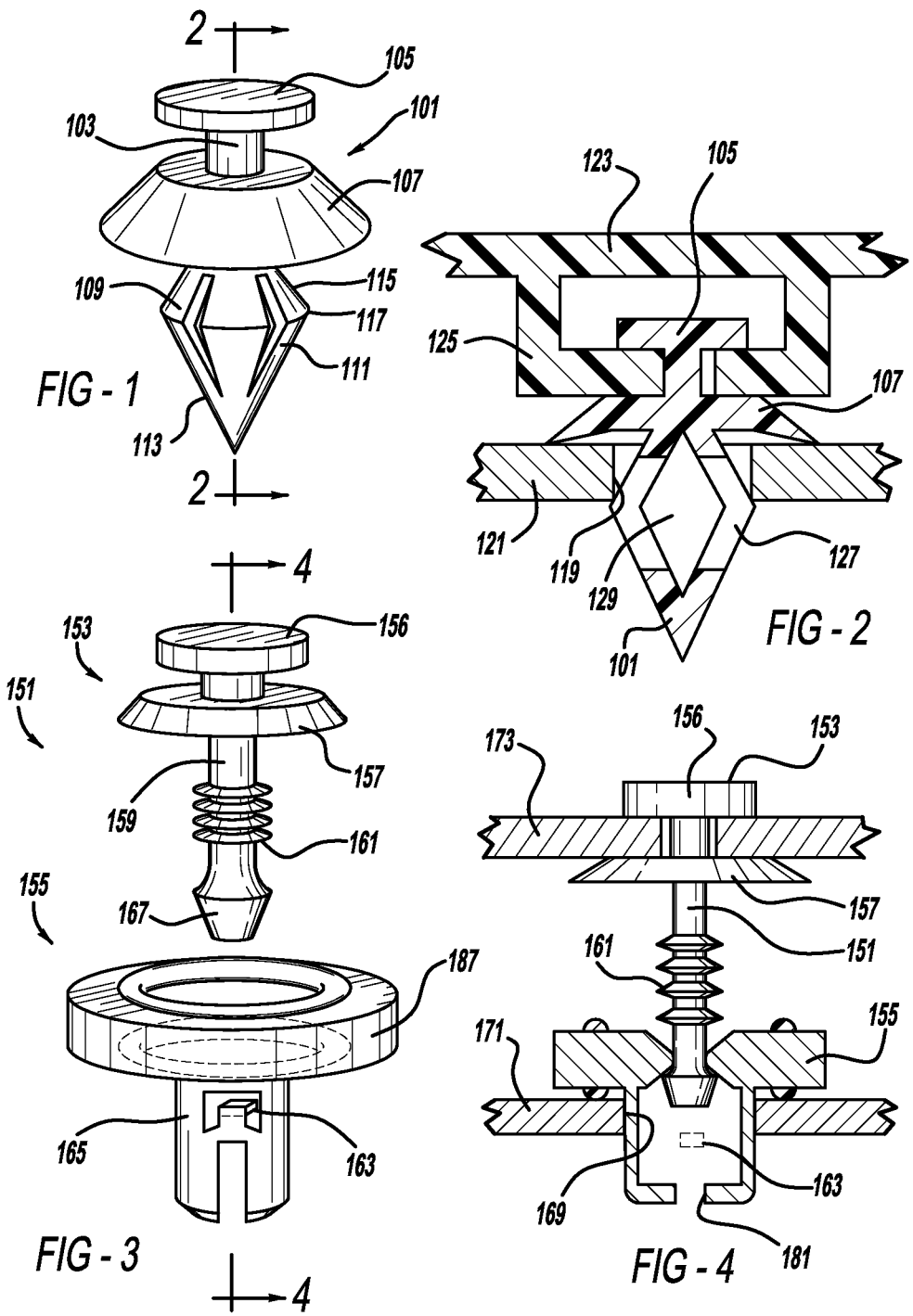

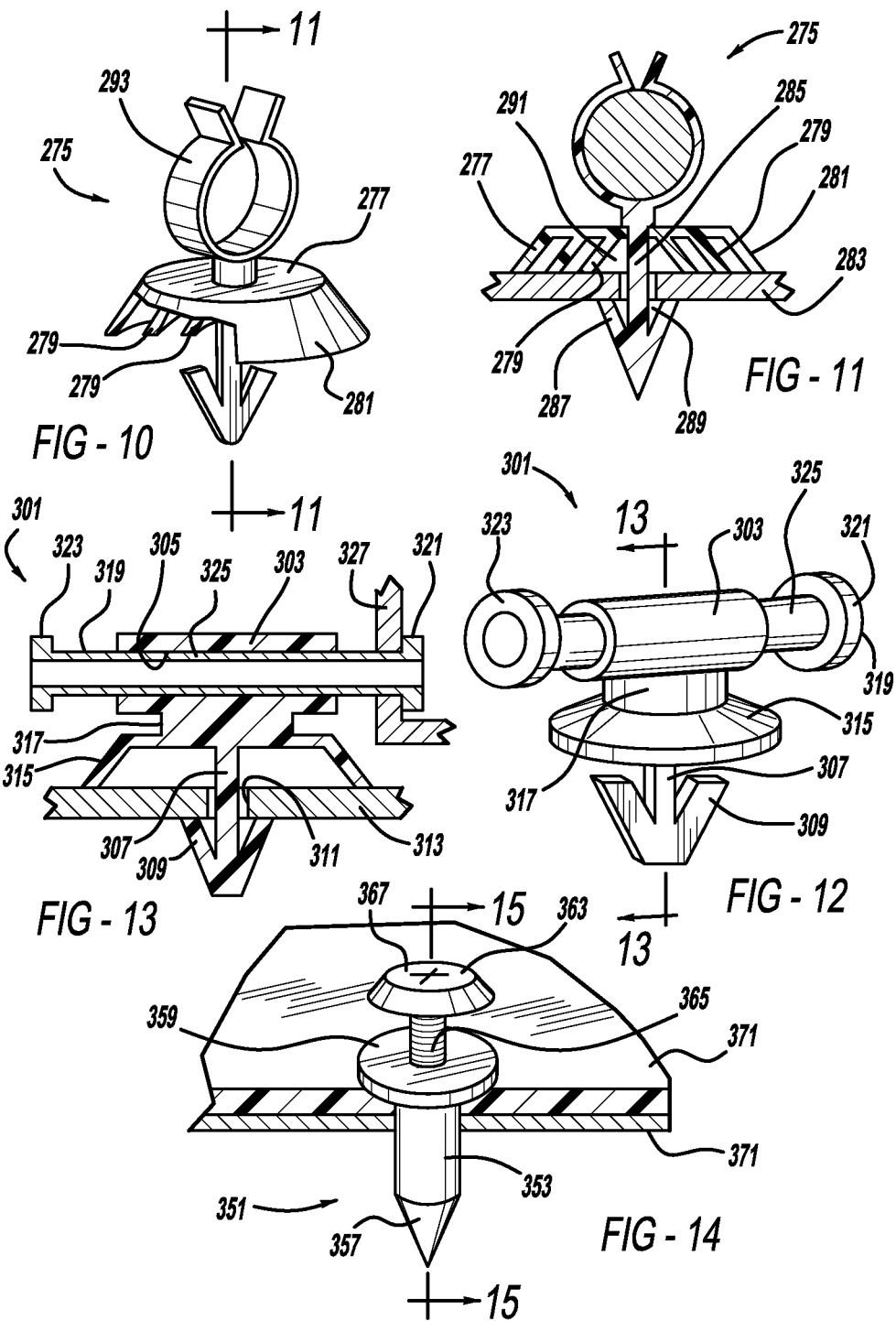

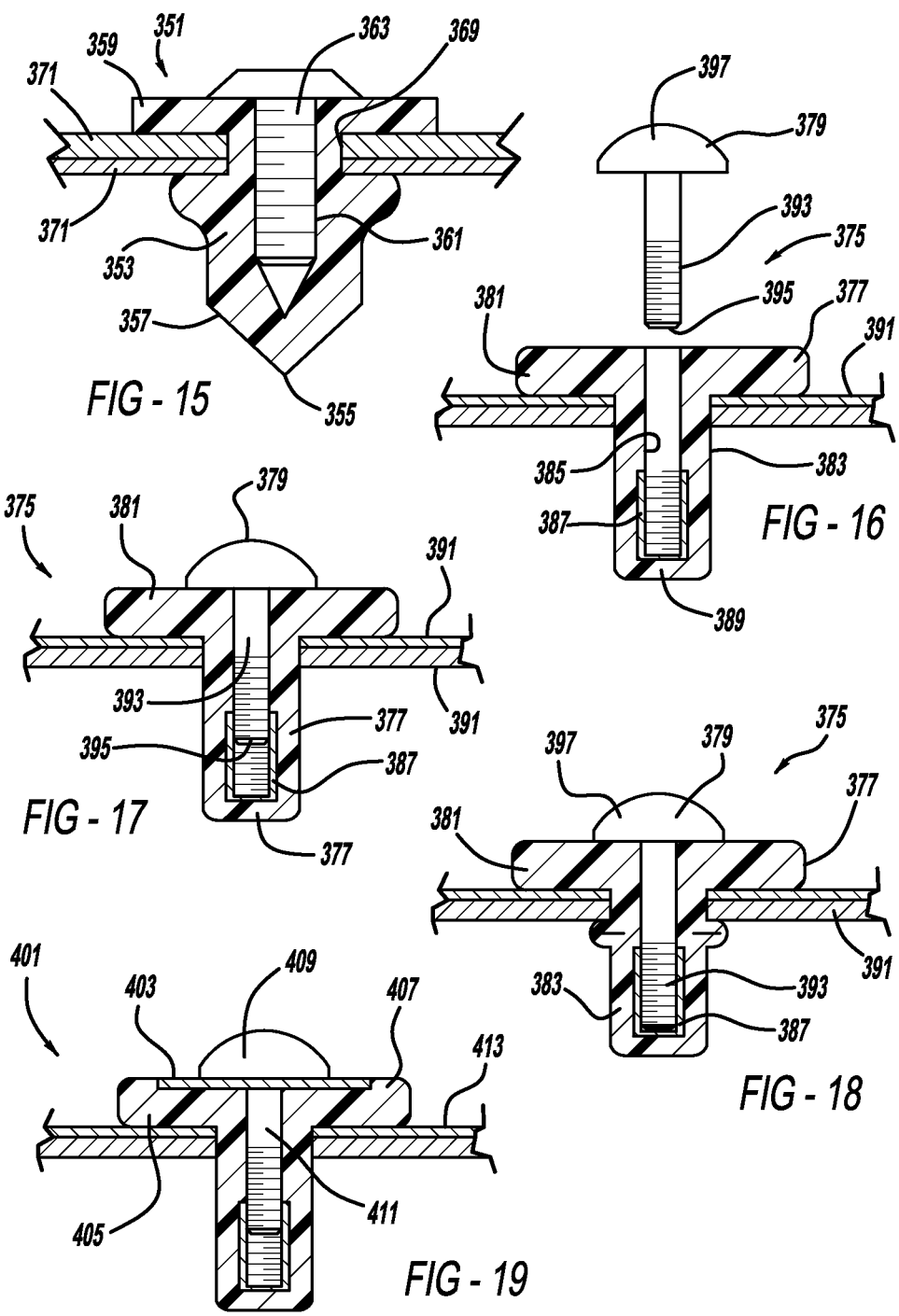

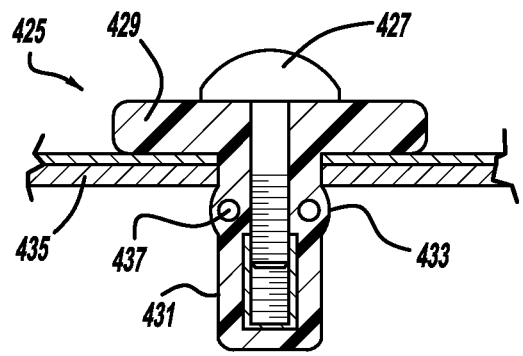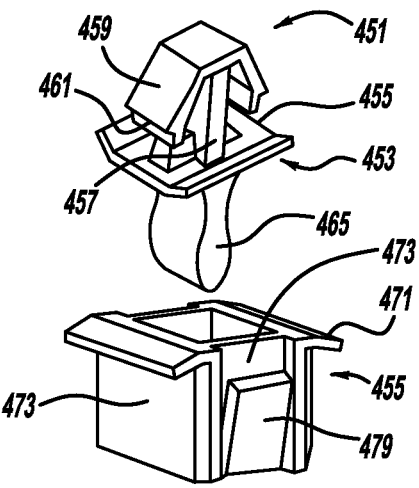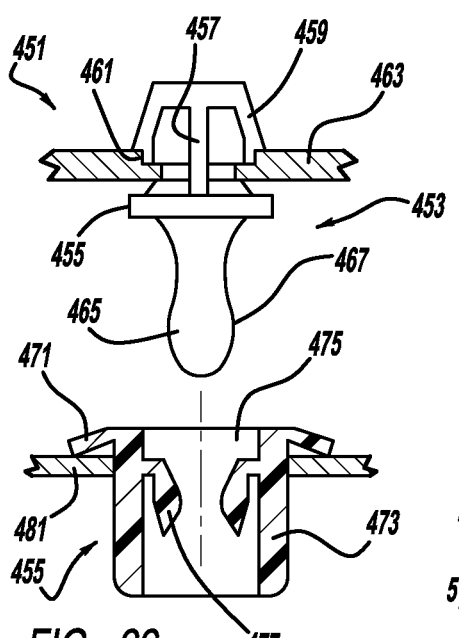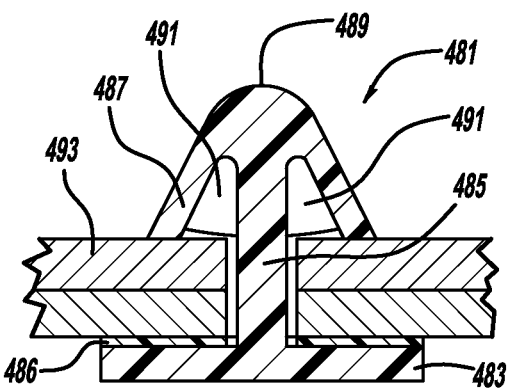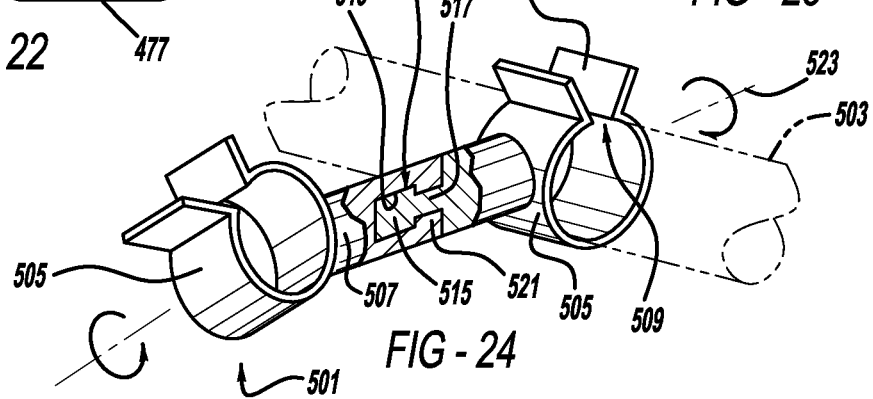

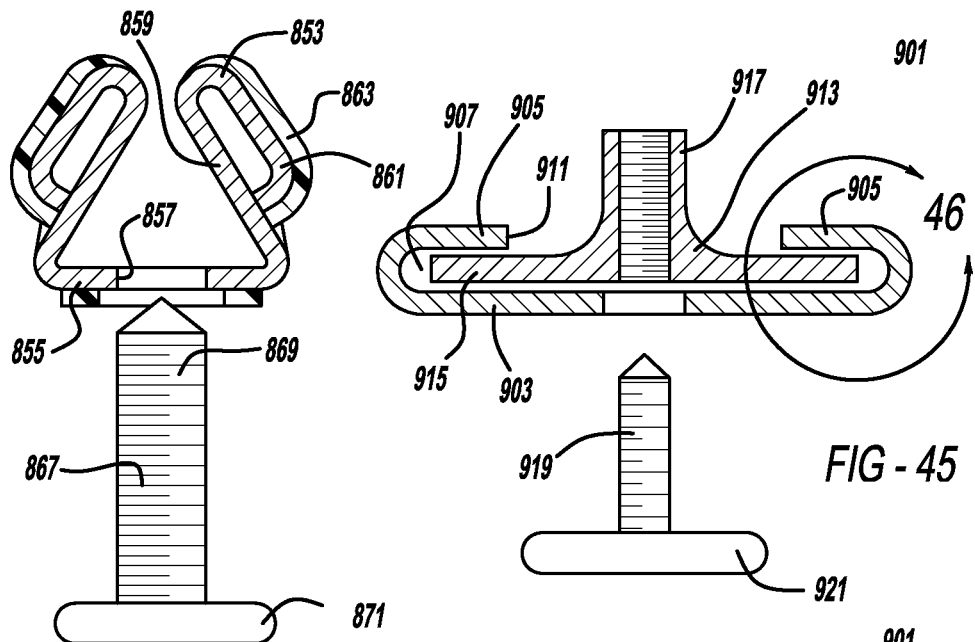
FIG - 45
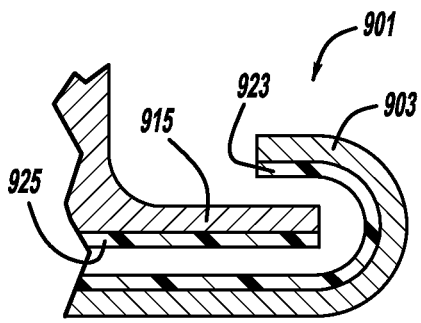
FIG - 46
FIG - 43
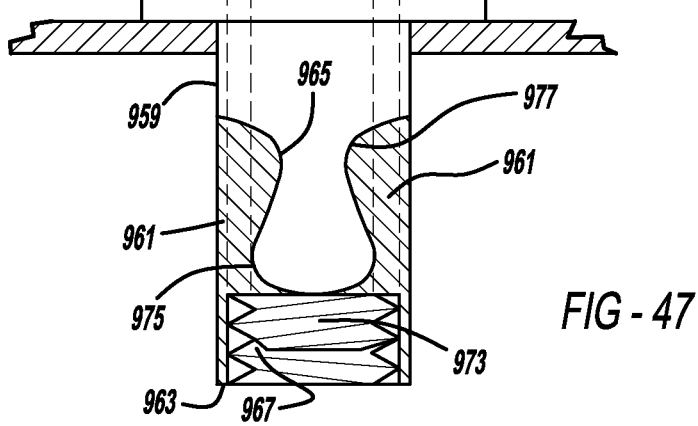
FIG - 47

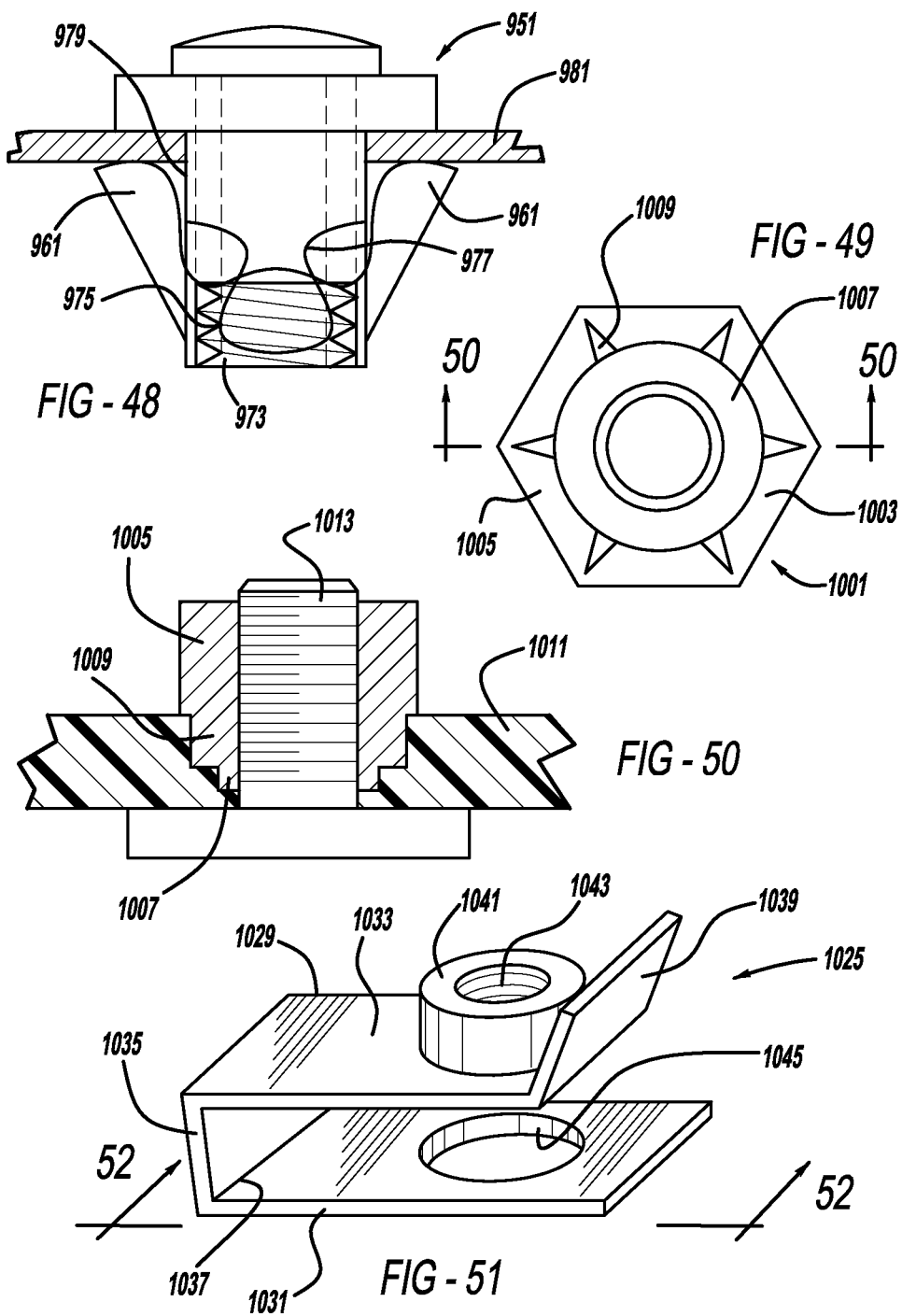

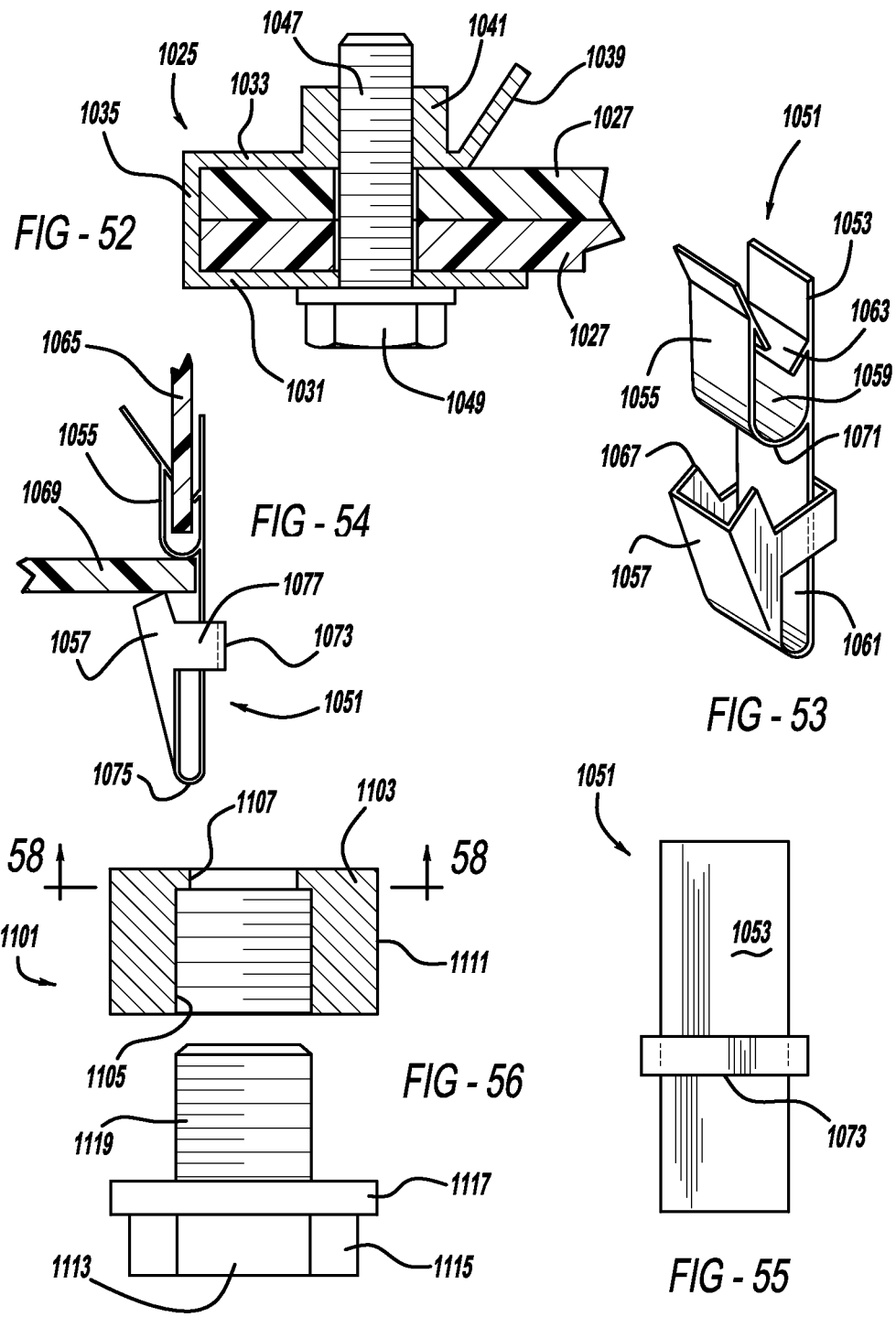

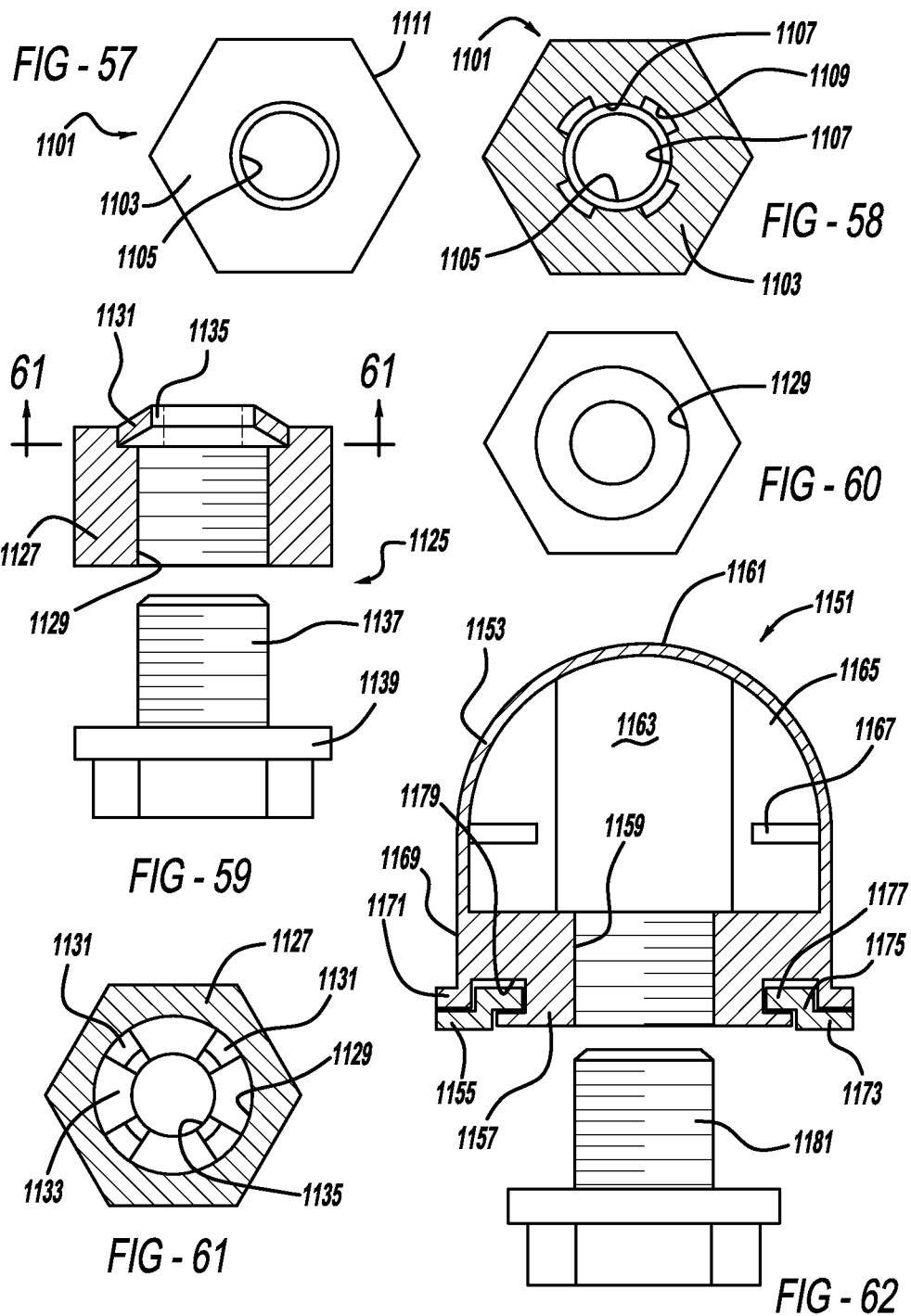

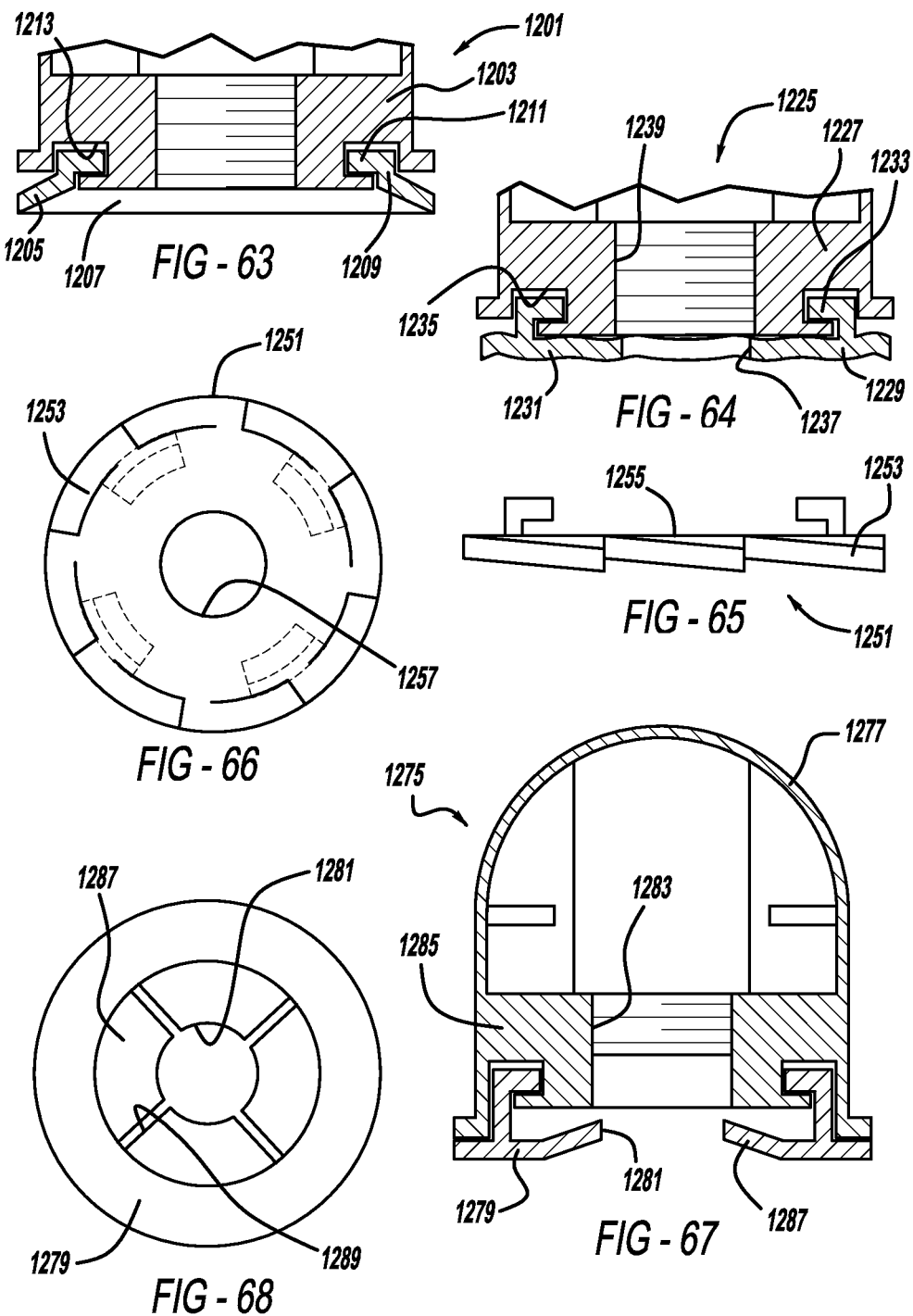

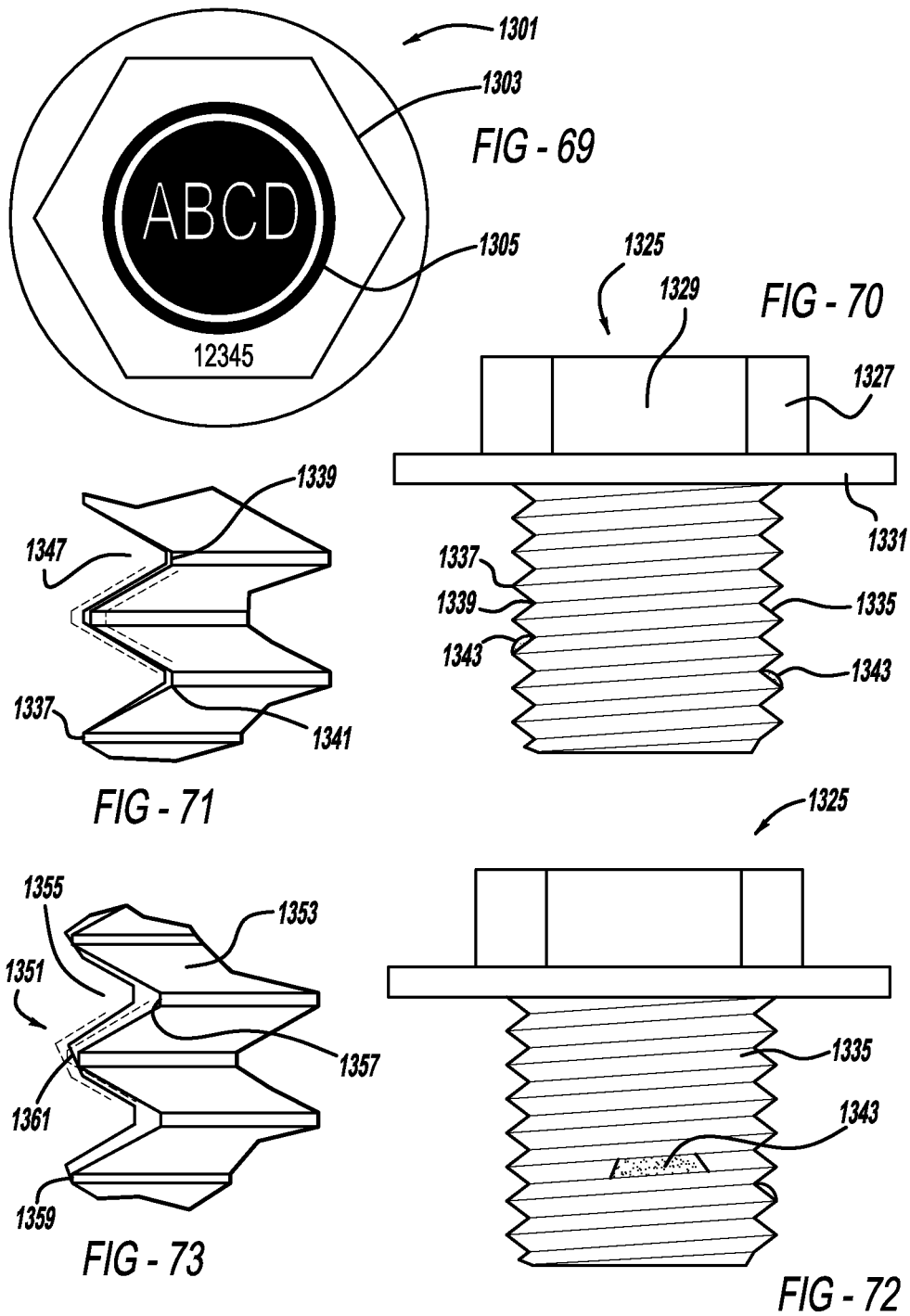

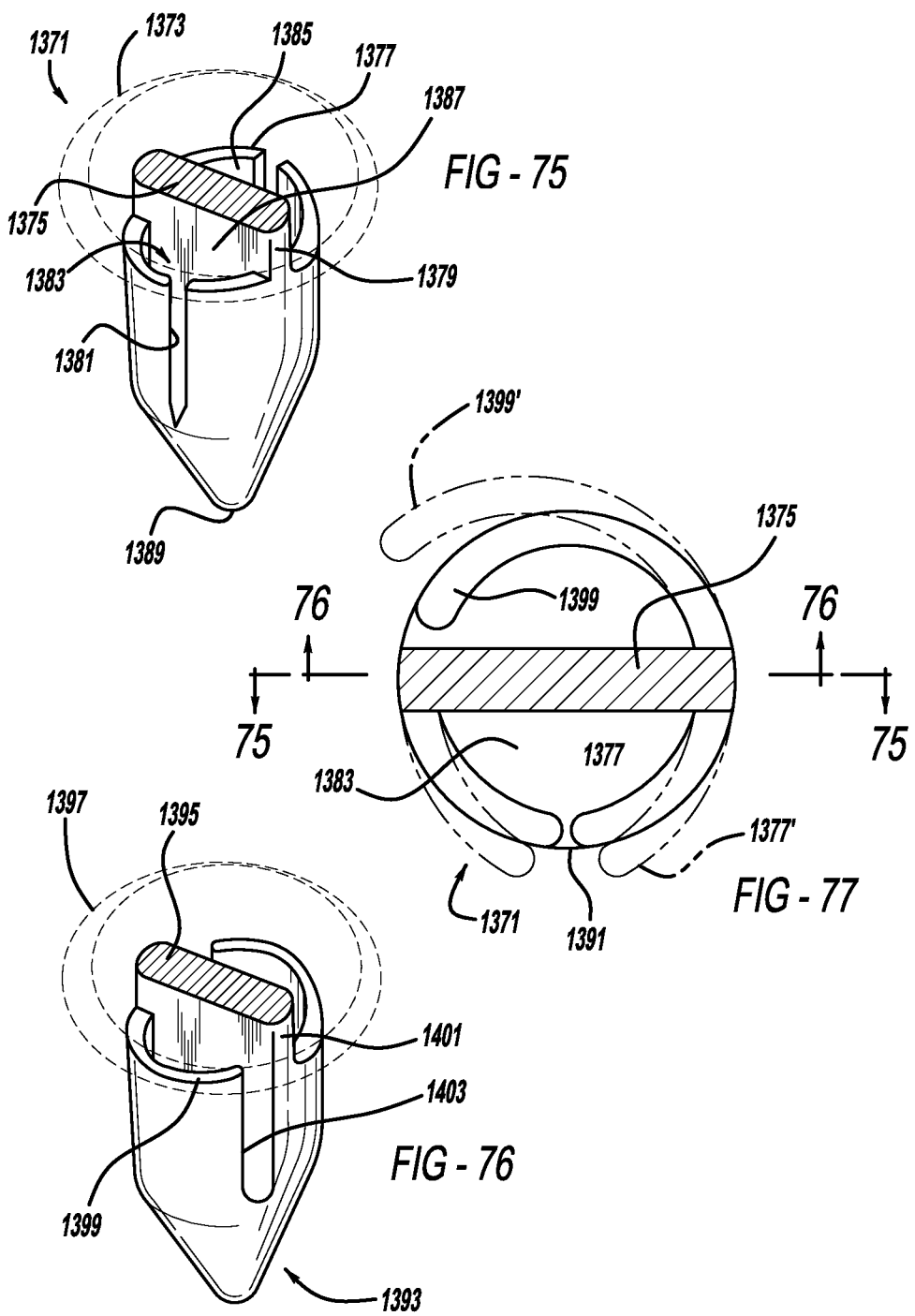

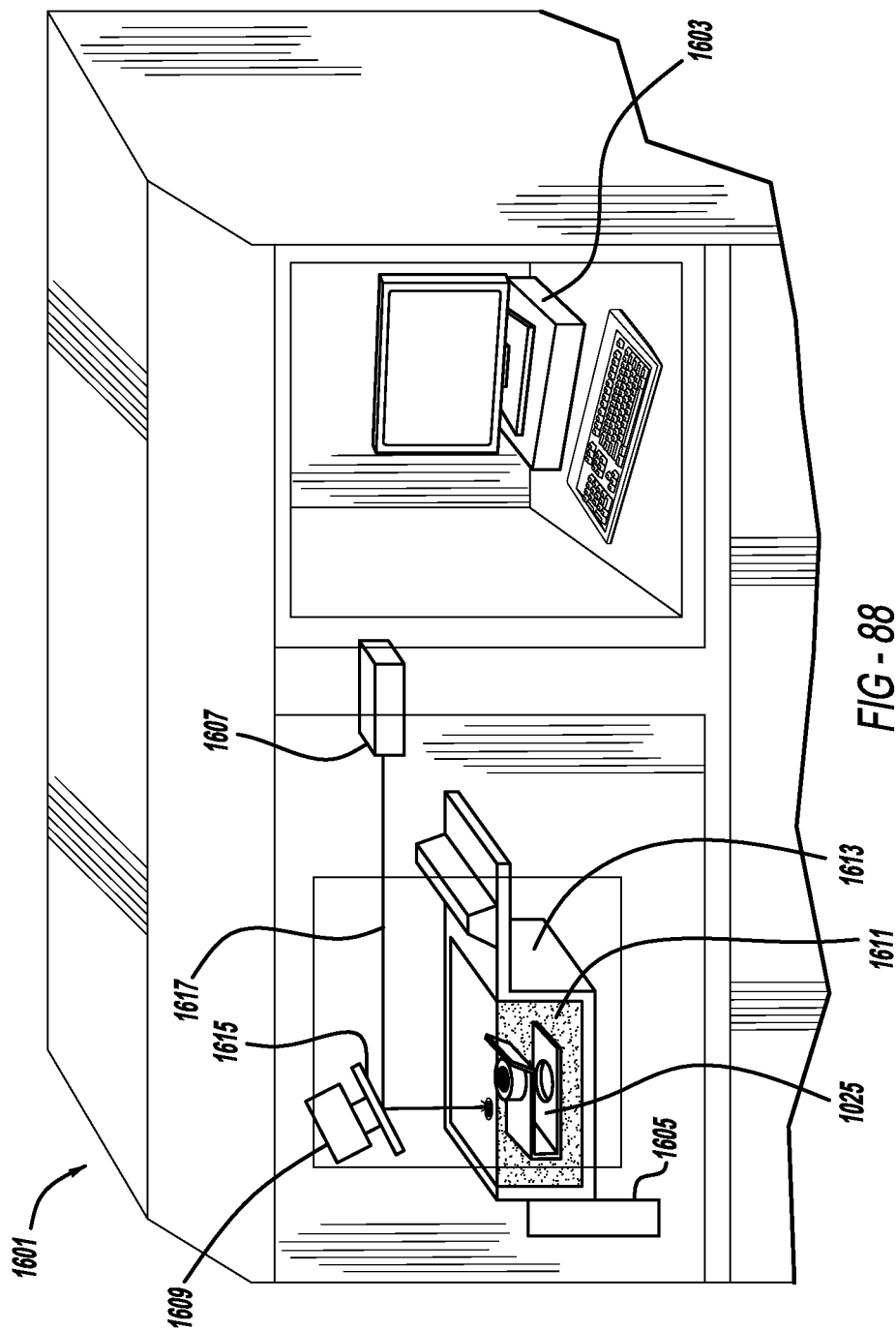

METHOD OF MAKING FASTENERS BY THREE-DIMENSIONAL PRINTING

CROSS-RELATED APPLICATIONS

This application is a continuation of International Patent Application Serial No. PCT/US2012/039445, filed on May 24, 2012, which claims priority to U.S. Provisional Patent Application Ser. No. 61/492,503, filed on Jun. 2, 2011, both of which are incorporated by reference herein.

BACKGROUND AND SUMMARY

The present invention relates generally to fasteners and more particularly to manufacturing of a fastener.

Traditionally, polymeric parts are made by injection or extrusion molding. In such processes, a heated polymeric liquid is inserted into match metal dies under high pressure, after which the dies are internally cooled in order to cure the manufactured parts. Air is vented from the die cavity when the molten polymer is injected therein. Injection and extrusion molding are ideally suited for high volume production where one hundred thousand or more parts per year are required. These traditional manufacturing processes, however, disadvantageously require very expensive machined steel dies, which are difficult and time consuming to modify if part revisions are desired, and are subject to problematic part-to-part tolerance variations. Such variations are due to molding shrinkage during curing, molding pressure differences, part warpage due to internal voids and external sink marks, and the like. The expense of this traditional die tooling makes lower volume production of polymeric parts prohibitively expensive.

It is also known to use stereolithography to produce non-functional polymeric parts. Such conventional stereolithography methods use a laser to create a layered part on a moving platform within a vat of liquid polymer. The part rises from the liquid as it is being made. These parts are extremely slow to produce and impractically brittle.

In accordance with the present invention, a fastener is provided. In another aspect, a fastener is made of layers of material, a light curable material and/or multiple built-up materials. Another aspect uses a three-dimensional printing machine to emit material from an ink jet printing head to build up a fastener. A further aspect provides a method of making a fastener by depositing material in layers and/or a built-up arrangement. Yet another aspect makes a fastener by depositing material in an environment where the fastener is essentially surrounded by a gas, such as air, during the material deposition. A method of making a multi-material and/or pre-assembled fastener is also employed in another aspect. In still another embodiment, direct laser metal sintering is used to create a fastener.

The present fastener and method are advantageous over traditional devices. For example, the present fastener and method do not require any unique tooling or dies, thereby saving hundreds of thousands of dollars and many weeks of die manufacturing time. Furthermore, the present method allows for quick and inexpensive design and part revisions from one manufacturing cycle to another. In another aspect, part-to-part tolerance variations are essentially non-existent with the present fastener and method such that at least ten, and more preferably at least forty, identical fasteners can be produced in a single machine manufacturing cycle. For other aspects of the present fastener and method, multiple head openings, a stationary support for the built-up fasteners within the machine, and the ambient air manufacturing environment allow for increased manufacturing speed, simpler machinery and ease of access to the manufactured fasteners. It is also noteworthy that the present fastener and method are advantageously capable of creating die-locked part configurations that would otherwise be prohibitively expensive, if not impossible, to produce with conventional dies. In other aspects, the present fastener and method reduce post-manufacturing assembly by creating mating parts in a pre-installed or pre-assembled condition within the same manufacturing machine cycle; for example, this can apply to screws, washers, inserts and/or seals. Materials of different characteristics, such as flexibility, tensile strength, hoop strength, chemical resistance, UV fade resistance, or even color can be deposited to create different sections of the fastener at essentially the same time. Additional advantages and features of the present invention can be found in the following description and appended claims as well as in the accompanying drawings.

BRIEF DESCRIPTION OF THE DRAWINGS

FIG. 1 is a perspective view showing a first embodiment of the present fastener;

FIG. 2 is a cross-sectional view, taken along line 2-2 of FIG. 1, showing the first embodiment fastener in a fully installed condition;

FIG. 3 is an exploded perspective view showing a second embodiment fastener;

FIG. 4 is a partially cross-sectional view, taken along line 4-4 of FIG. 3, showing the second embodiment fastener in an intermediate installed condition;

FIG. 10 is a partially fragmented perspective view showing a fifth embodiment fastener;

FIG. 11 is a cross-sectional view, taken along line 11-11 of FIG. 10, showing the fifth embodiment fastener in an installed condition;

FIG. 12 is a perspective view showing a sixth embodiment fastener;

FIG. 13 is a cross-sectional view, taken along line 13-13 of FIG. 12, showing the sixth embodiment fastener in an installed condition;

FIG. 14 is a perspective view showing a seventh embodiment fastener in an intermediate installed condition;

FIG. 15 is a partially cross-sectional view, taken along line 15-15 of FIG. 14, showing the seventh embodiment fastener in a fully installed condition;

FIG. 16 is a partially exploded and partially cross-sectional view showing an eighth embodiment fastener in an intermediate installed condition;

FIG. 17 is a view like that of FIG. 16 showing the eighth embodiment fastener in an intermediate installed condition;

FIG. 18 is a view like that of FIG. 16 showing the eighth embodiment fastener in a fully installed condition;

FIG. 19 is a partially cross-sectional view showing a ninth embodiment fastener in an intermediate assembled condition;

FIG. 20 is a partially cross-sectional view showing a tenth embodiment fastener in an intermediate installed condition;

FIG. 21 is an exploded perspective view showing an eleventh embodiment fastener;

FIG. 22 is a partially sectional and partially exploded view of the eleventh embodiment fastener in a partially installed condition;

FIG. 23 is a cross-sectional view showing a twelfth embodiment fastener in an installed condition;

FIG. 24 is a partially fragmented, perspective view showing the thirteenth embodiment fastener in an installed condition;

FIG. 43 is an exploded cross-sectional view showing a twenty-fourth embodiment fastener;

FIG. 45 is an exploded cross-sectional view showing a twenty-fifth embodiment fastener;

FIG. 46 is an enlarged cross-sectional view, taken within circle 46 of FIG. 45, showing a different variation of the twenty-fifth embodiment fastener;

FIG. 47 is a partially sectional, side view showing a twenty-sixth embodiment fastener in an intermediate installed condition;

FIG. 48 is a view, like that of FIG. 47, showing the twenty-sixth embodiment fastener in a fully installed condition;

FIG. 49 is a top elevational view showing a twenty-seventh embodiment fastener;

FIG. 50 is a cross-sectional view, taken along line 50-50 of FIG. 49, showing the twenty-seventh embodiment fastener in a fully installed condition;

FIG. 51 is a perspective view showing a twenty-eighth embodiment fastener;

FIG. 52 is a cross-sectional view, taken along line 52-52 of FIG. 51, showing the twenty-eighth embodiment fastener in an installed condition;

FIG. 53 is a perspective view showing a twenty-ninth embodiment fastener;

FIG. 54 is a partially sectional side view showing the twenty-ninth embodiment fastener in an installed condition;

FIG. 55 is a back elevational view showing the twenty-ninth embodiment fastener of FIG. 53;

FIG. 56 is an exploded sectional view showing a thirtieth embodiment fastener;

FIG. 57 is a bottom elevational view showing the thirtieth embodiment fastener;

FIG. 58 is a cross-sectional view, taken along line 58-58 of FIG. 56, showing the thirtieth embodiment fastener;

FIG. 59 is an exploded cross-sectional view showing a thirty-first embodiment fastener;

FIG. 60 is a bottom elevational view showing the thirty-first embodiment fastener;

FIG. 61 is a cross-sectional view, taken along line 61-61 of FIG. 59, showing the thirty-first embodiment fastener;

FIG. 62 is an exploded cross-sectional view showing a thirty-second embodiment fastener;

FIG. 63 is a fragmented cross-sectional view showing a thirty-third embodiment fastener;

FIG. 64 is a fragmented cross-sectional view showing a thirty-fourth embodiment fastener;

FIG. 65 is a side elevational view showing a washer employed in a thirty-fifth embodiment fastener;

FIG. 66 is a bottom elevational view showing the thirty-fifth embodiment fastener of FIG. 65;

FIG. 67 is a cross-sectional view showing a thirty-sixth embodiment fastener;

FIG. 68 is a bottom elevational view showing the thirty-sixth embodiment fastener;

FIG. 69 is a top elevational view showing a thirty-seventh embodiment fastener;

FIG. 70 is a side elevational view showing a thirty-eighth embodiment fastener;

FIG. 71 is an enlarged elevational view showing the thirty-eighth embodiment fastener;

FIG. 72 is an elevational view, taken 90 degrees opposite that of FIG. 70, showing the thirty-eighth embodiment fastener;

FIG. 73 is an enlarged elevational view, like that of FIG. 71, showing a thirty-ninth embodiment fastener;

FIG. 75 is a fragmentary perspective view showing a forty-first embodiment fastener;

FIG. 76 is a fragmentary perspective view showing a forty-second embodiment fastener;

FIG. 77 is a fragmentary top elevational view with the lower half showing the forty-first embodiment fastener and the upper half showing the forty-second embodiment fastener;

FIG. 88 is a perspective view showing a machine manufacturing the twenty-eighth embodiment fasteners.

DETAILED DESCRIPTION

Figure 5:
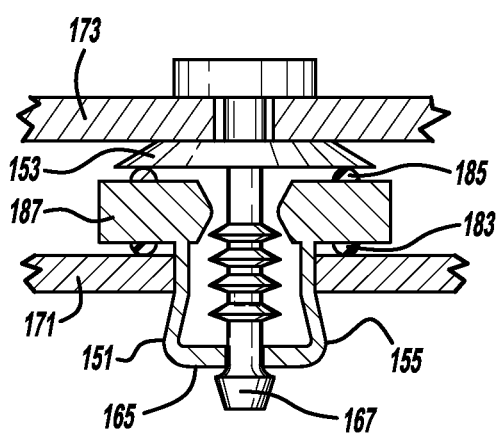
FIG. 5 is a partially cross-sectional view, like that of FIG. 4 showing the second embodiment fastener in a fully installed condition.

Referring to FIGS. 1 and 2, a fastener 101 includes an elongated body or shaft 103, a laterally enlarged head flange 105, a laterally enlarged umbrella flange 107 and a workpiece-engaging member 109. Workpiece-engaging member 109 further includes at least two, and more preferably at least four barb-like legs 111 which each have a relatively gently angled and tapered lead-in section 113 and a more abruptly angled retention section 115 intersecting at a peak 117. These leg angles provide relatively easy insertion into a hole 119 of a sheet metal panel workpiece 121, and more difficult extraction of the legs therefrom after complete fastening.

An interior trim panel workpiece 123 is attached to fastener 101 between flanges 105 and 107 by a localized dog house 125. Umbrella flange 107 has flexible frusto-conical edges which are compressible to seal around hole 119 to deter a fluid, such as water or air, from passing therethrough. Longitudinally elongated slots 127 are located between each adjacent pair of legs 111 and a hollow open area 129 is centrally located between legs 111. Opening 129 presents a die-locked condition if made with conventional die tooling. Furthermore, opening 129 allows for lateral compression of legs 111 toward a longitudinal centerline of the fastener during fastener installation and removal. This opening 129 advantageously reduces the weight and material cost of the part. Fastener 101 is preferably made by three-dimensionally printing an ultraviolet light curable polymer in a layering manner without dedicated tooling, as will be described in greater detail hereinafter.

FIGS. 3-5 show another embodiment fastener 151 which includes a male insertion component 153 and a female grommet component 156. Male insertion component 153 includes a generally circular and enlarged head flange 155, an enlarged and generally circular umbrella flange 157 and a longitudinally elongated and generally cylindrical shaft 159. Multiple ridge formations 161 are spaced around shaft 159 to provide various grommet-engaging interlocks via inwardly projecting fingers 163 internally extending from a body 165 of grommet 155 when shaft 159 is fully inserted. Furthermore, a bulbous or laterally enlarged end 167 of male component 153 is located adjacent a distal end of shaft 159 so as to provide an intermediate retention feature to retain male component 153 within grommet 155 during shipping and initial fastener insertion into a hole 169 of a sheet metal automotive vehicle panel 171. An interior trim panel 173 is retained around shaft 159 between flanges 155 and 157.

When male component 153 is fully inserted between the positions of FIGS. 4 and 5, bulbous end 167 is inserted through a longitudinally extending aperture 181 of grommet 155 while the adjacent portion of shaft 159 outwardly expands legs of body 165 so that grommet 155 is firmly secured within hole 169. Additionally, a pair of O-ring seals 183 and 185 are integrally printed and attached to a circular flange 187 of grommet 155 on opposite sides thereof, so as to provide a resilient seal against the adjacent panels or flanges. Fastener 151 is preferably made by three-dimensionally printing a first polymeric material for the male component, either the same or a more flexible polymeric material for the grommet, and yet a different and more resilient polymeric material for the seals.

Figure 6:
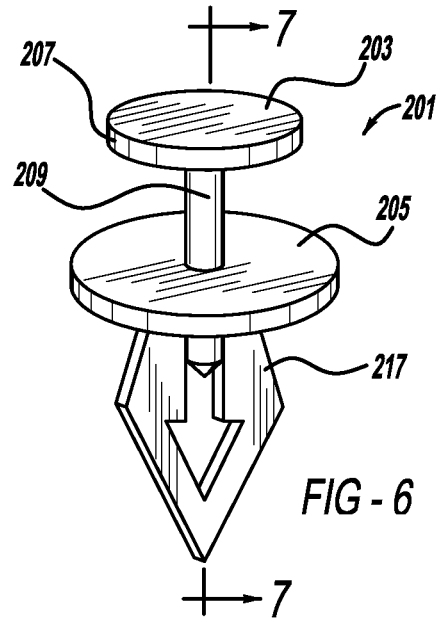
FIG. 6 is a perspective view, showing a third embodiment fastener in an intermediate installed condition.
Figure 7:
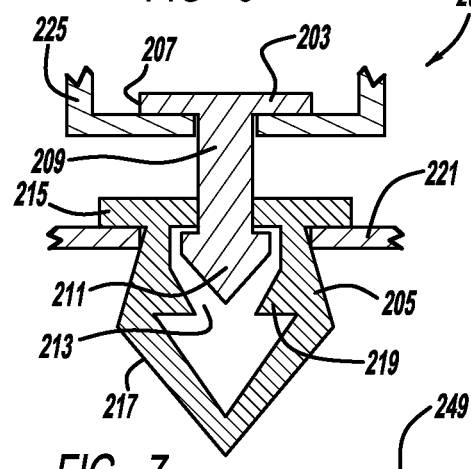
FIG. 7 is a cross-sectional view, taken along line 7-7 of FIG. 6, showing the third embodiment fastener in the intermediate installed condition.

Another embodiment fastener 201 can be observed with reference to FIGS. 6 and 7. This embodiment fastener includes a male insert component 203 and a mating female grommet component 205. Male component 203 includes a laterally enlarged and circular head flange 207, and a cylindrical and longitudinally elongated stem 209. Enlarged barb-like legs 211 laterally extend from a distal end of stem 209 within an undercut open area 213 of grommet 205. Furthermore, grommet 205 includes an upper cylindrical flange 215, at least two barb-like legs 217 and inwardly extending triangular structures 219. Male member 203 is pre-installed into grommet 205 after which legs 217 are inserted in a hole in a workpiece panel 221. Male member 203 is thereafter fully inserted such that legs 211 are snap-fit engaged past triangular structures 219 so as to be firmly locked therein. This serves to retain a second workpiece 225 between head 207 and flange 215.

Fastener 201 is preferably three-dimensionally printed from a polymeric material. More particularly, male member 203 is manufactured in an additive, building up and layering manner with legs 211 positioned inside of opening 213 of grommet 205, at substantially the same time in a single machine cycle; this provides a pre-installed and pre-assembled condition without dedicated tooling or extra manual assembly. The components can be made of the same or different materials. Moreover, a small aperture is used in flange 215 through which stem 209 moves; an oversized slot or two piece flange is not required to allow assembly of the larger legs 211 as would otherwise be necessary for traditional processes.

Figure 8:
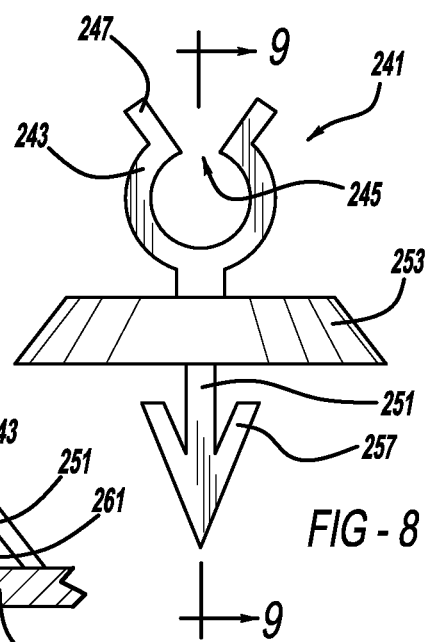
FIG. 8 is a side-elevational view showing a fourth embodiment fastener.
Figure 9:
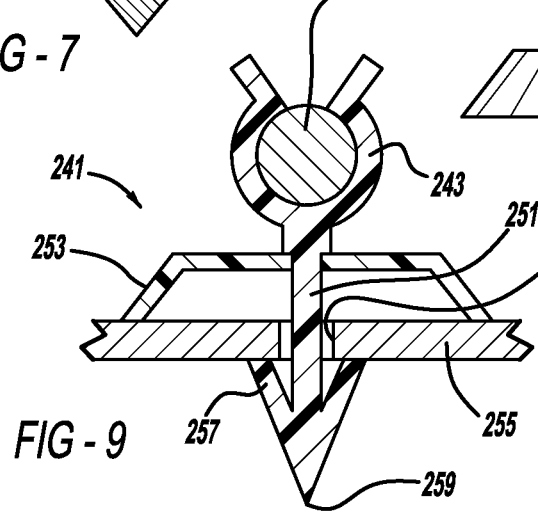
FIG. 9 is a cross-sectional view, taken along line 9-9 of FIG. 8, showing the fourth embodiment fastener in an installed condition.

FIGS. 8 and 9 illustrate another embodiment fastener 241. Fastener 241 includes a partially circular workpiece-receptacle 243 which is accessible through opening 245 defined by a pair of outwardly diverging diagonal walls 247. An elongated workpiece 249, such as an electrical wire, fluid carrying tube or the like, is retained within receptacle 243 and is insertable therein by snapping elongated workpiece 249 through opening 245 which outwardly expands receptacle 243. Given the specific snap-fit entry geometries, the insertion forces for workpiece 249 entering receptacle 243 are less than extraction forces required for its removal.

A longitudinally elongated body or shaft 251 projects from receptacle 243. A generally circular umbrella flange 253 laterally extends from shaft 251 and flexibly seals against a sheet metal workpiece panel 255. A barb-like pair of legs 257 diagonally protrude from a distal end of shaft 251 and terminate at a lead-in point 259. Legs are linearly pushed through a hole 261 of workpiece panel 255 by inwardly flexing distal ends the legs toward shaft 251. Thereafter, legs naturally outwardly expand to their nominal position and deter, if not prevent, extraction of the legs back through hole 261. Thus, fastener 241 serves to fasten elongated workpiece 249 to workpiece panel 255. This can be used to secure electrical wires, air conditioning hoses, brake fluid hoses, fuel lines, or the like within an automotive vehicle.

Fastener 241 is preferably three-dimensionally printed from a light curable polymeric material. In one configuration, the entire, single piece fastener is made of a single polymeric material, but in other configurations, shaft 251 can be made from a rigid three-dimensionally printable polymer, legs 257 can be made from a more resilient three-dimensionally printable polymer, receptacle 243 can be made from a third and intermediate resilient three-dimensionally printable polymer but which also exhibits different tensile and hoop strengths, and the frusto-conical angled ends of umbrella flange 253 can be made from the most resilient three-dimensionally printable polymer. It is also noteworthy that the undercuts between ends of legs 257 adjacent shaft 251 and the facing cup-like underside of umbrella flange 253 creates a die lock condition with conventional injection molding, however, this is not of concern with the present three-dimensional printing process.

FIGS. 10 and 11 illustrate another embodiment fastener 275. This fastener is similar to that of the embodiment illustrated in FIGS. 8 and 9, however, an umbrella flange 277 further has multiple internal ribs 279 which are diagonally extending generally parallel to a frusto-conical skirt 281 at the edge of umbrella 277. This enhances the watertight sealing of umbrella 277 against a workpiece panel 283 while also providing added rigidity to umbrella 277. Moreover, ribs 279 have a generally frusto-conical shape coaxially aligned with a body or shaft 285. Barb-like legs 287 create somewhat triangular cavities 289 facing cavity openings 291 between shaft 285 and ribs 279. Three-dimensional printing of fastener 275 makes it relatively simple to manufacture these facing cavity conditions between legs 287 and ribs 279, and also the collar-like receptacle 293, since specialized tooling and matching dies are not required to manufacture such. The ribs can be the same or a different material from the umbrella which may also be the same or different materials from the remainder of the fastener.

Referring now to FIGS. 12 and 13, a fastener 301 serves as an adjustable position nut. Fastener 301 includes a generally cylindrical and hollow body 303 with an internal bore 305 laterally extending therethrough. A longitudinally elongated shaft 307 projects from body 303 with barb-like legs 309 flexibly projecting adjacent a distal end thereof. Part of shaft 307 and legs 309 are inserted through a hole 311 in a sheet metal workpiece panel 313. A laterally extending and generally circular umbrella flange 315 extends from shaft 307 with a large diameter pedestal 317 between umbrella 315 and body 303. Umbrella flange 315 seals hole 311 when fully assembled.

A hollow rod 319 has a pair of enlarged ends 321 and 323 between which is a generally cylindrical middle 325. Rod 319 can be laterally slid back and forth between ends 321 and 323 within bore 305 of body 303. Furthermore, rod 319 can be rotated within body 303. This provides an adjustment feature for a connected workpiece 327 attached to rod 319. Fastener 301 is preferably three-dimensionally printed from an ultraviolet light curable polymer, although rod 319 is simultaneously built up in layers in the same machine cycle from either a different polymeric material or even a three-dimensionally printable metallic material. This simultaneous manufacturing of rod 319 and body 303 eliminates the need for post-manufacturing assembly and the otherwise required conventional need for a post-assembly attachment of a separate end piece 321 or 323. In one configuration, body 303 can be three-dimensionally printed from a more lubricious polymer than the remainder of the fastener.

FIGS. 14 and 15 show another embodiment fastener 351 which acts like a dry-wall molly or scrivet. Fastener 351 has a grommet component including a longitudinally elongated body or shaft 353 having a pointed lead-in end 355 bordered by a conically tapered surface 357. A generally circular head flange 359 laterally extends from an opposite end of shaft 353. Additionally, shaft 353 has a generally cylindrical outside surface prior to complete fastening. A longitudinally elongated internal bore 361 is openly accessible from flange 359 for receiving a threaded screw 363 therein. Screw 363 has a longitudinally elongated threaded shaft 365 ending in a laterally enlarged head flange 367 with a tool interface therein. Such a tool interface is shown as a Phillips head screwdriver receptacle but may alternately be a straight-bladed screwdriver receptacle or other pattern. Bore 361 is preferably internally threaded but may alternately have a cylindrical inside surface if screw threads 365 are of a self-tapping nature.

Screw is either printed as part of or separately pre-assembled to shaft 353 prior to their insertion into a hole 369 of one or more workpiece panels 371. Screw 363 is only partially installed in this initial workpiece insertion condition, as is shown in FIG. 14. Thereafter, the user further tightens and inserts screw 363 fully into shaft 353 thereby pulling end 355 toward flange 359. This causes the sidewall section of shaft 353 to outwardly bulge and expand in a folded manner thereby preventing extraction of fastener 351 from workpieces 371. Fastener 351, however, can be removed from workpieces 371 after screw 363 is mostly or fully disengaged from shaft 353. Fastener 355 is three-dimensionally printed with or without screw 363. As an alternate manufacturing approach for fastener 351, the fastener can be manufactured from two different metallic materials, with the screw being a more durable and hard metallic material but with the grommet being a relatively softer and more pliable metallic material. Another alternate process employs direct laser metal sintering as will be described in greater detail hereinafter.

Another embodiment fastener 375 can be observed in FIGS. 16-18. Fastener 375 includes a female grommet component 377 and a male screw component 379. Grommet 377 includes a laterally enlarged and relatively thicker flange 381 and a longitudinally extending and generally cylindrical (in its nominal, pre-secured condition as shown in FIGS. 16 and 17) shaft or body 383. A longitudinally elongated bore 385 extends through flange 381 and body 383 and is accessible from the flange end thereof. A generally cylindrical and cup-shaped insert 387 is located in an end of bore 385 adjacent a closed end 389 of body 383. Insert 387 has internal threads therein and optionally, a splined peripheral surface, while the remainder of bore 385 has a smooth inside surface. Grommet 377 is initially manufactured by three-dimensionally printing body 383 simultaneous with insert 387 wherein insert 387 is preferably made from a hard polymer while the remainder of body 383 is simultaneously built up from a more pliable polymer. Thus, the insert is integrally connected to grommet due to its manufacture. The lower surface of flange 381, which contacts against one or more workpiece panels 391, is preferably built up from a vibration dampening polymer which may be softer than that for the remainder of body 383 in another configuration of the present fastener.

FIG. 17 illustrates the fully inserted but not yet secured fastener condition wherein screw 379 has its threaded shaft 393 fully inserted but not tightened within bore 385 of grommet 377. In this position, a few threads closest to a leading end 395 of screw 379 are enmeshed with a trailing end of insert 387. This inserted but pre-secured condition can either be simultaneously manufactured through three-dimensional printing or alternately direct laser metal sintering, or separately assembled prior to insertion of the grommet into workpieces 391, or less preferably, screw 379 can be inserted into grommet 377 after the grommet has been inserted into the workpieces. Screw 379 is either made of a metallic material (via three-dimensional printing or direct laser metal sintering, or through conventional cold forming processes, although some benefits will not be achieved). Alternately, the screw may be a polymeric material of greater rigidity, tensile strength and durability than the grommet. Finally, the user applies a tool to a head 397 of screw 379 whereby the threads adjacent end 395 of screw 379 fully engage essentially all of the internal threads of insert 387. This causes a collapsing and folding of an intermediate section of body 383 in order to outwardly expand this section to securely grip workpieces 391 between it and flange 381. This construction advantageously avoids the need to insert mold or post-assemble insert 387 within bore 385 through conventional processes, thereby avoiding this secondary and costly operation, and also avoiding the part-to-part manufacturing tolerance variations inherent with such conventional processes.

FIG. 19 shows yet another embodiment fastener 401 which is essentially the same as the prior embodiment but for an additional washer 403. Washer 403 is integrally built up through three-dimensional printing as part of and simultaneously with the adjacent flange 405 of a grommet 407. Washer 403, however, is made of a much more rigid and hard polymeric or metallic material than is the adjacent grommet 407. This provides a much firmer bearing surface for a head 409 of screw 411 when the screw is directly or indirectly tightened against grommet 407 during full fastening of fastener 401 to workpieces 413. Washer 403 preferably has a circular top view shape, but may alternately have a polygonal or other peripheral shape.

Reference should now be made to FIG. 20. A fastener 425 includes a screw 427 and grommet 429 much like that of the prior embodiment, however, body 431 of grommet 429 is manufactured with a pre-installed lateral bulge 433 to at least temporarily retain grommet 429 within workpieces 435. Workpieces 435 are flat sheet metal panels, dry wall panels or wood panels, by way of example. Bulge 433 is either of a thickened wall cross-sectional area without any internal voids or undesired sink marks, or may optionally have a desired and predetermined (in shape, size and location) hollow space 437 such as that illustrated. Space 437 is manufactured as a continuous and fully enclosed hollow ring within the wall of body 431 at bulge 433 in order to provide a desired point of flexure during installation and/or longitudinal collapsing while being fully secured.

FIGS. 21 and 22 illustrate another embodiment fastener 451 having a male component 453 and a mating female component 455. Male component 453 includes a laterally extending flange 455, a generally longitudinally extending shaft 457 and a pair of snap-in wings or legs 459. Shaft 457 has a + cross-sectional shape and each leg has an offset step 461 adjacent an end thereof which engages a workpiece panel 463. A male insertion shaft 465, having a generally arcuate periphery with a bulbous section 467, longitudinally projects from flange 455 generally aligned with shaft 457.

Female component 455 includes a laterally enlarged flange 471 from which longitudinally extends a box-like body defined by four side walls 473. A hollow through cavity 475 is located within walls 473 to receive shaft 465 therein when installed. In the installation condition, bulbous section 467 is removably engaged by at least a pair of flexible snap-fit fingers 477 inwardly projecting from a pair of opposite side walls 473. Additionally, outwardly diverging wings or legs 479 are provided on a pair of walls 473 so as to engage another workpiece 481 between an end thereof and flange 471. Both components of fastener 451 are preferably three-dimensionally printed from polymeric materials which are ultraviolet light curable. In one configuration, fingers 477 and legs 479 are layered from more resilient and flexible polymeric materials than are shafts 457 and 465 of male component 453, and also more resilient and flexible than walls 473 and flange 471 of female component 455. Legs 479 may also be more rigid than fingers 477 using different polymers in the simultaneous printing process, for another configuration. This fastener embodiment provides a two-piece panel latch attachment.

Another embodiment fastener 481 is shown in FIG. 23. This fastener 481 includes an enlarged flange or head 483 readily extending from a longitudinally elongated body or stem 485. A resilient seal 486 is integrally printed on a backside of head 483. A pair of barb-like snap-in legs 487 project from a distal end of shaft 485 and inwardly angle toward a narrower lead-in end 489. A thin web 491 perpendicularly bridges between the majority of each leg 487 and the adjacent facing surface of shaft 485. Fastener 481 is preferably three-dimensionally molded from an ultraviolet light curable, polymeric material with the webs 491 and seal 486 being of a more flexible and resilient polymer than the rest of the fastener. This web material will increase retention of the fastener in workpieces 493 by deterring, if not preventing, legs 487 from undesirably flexing out of the way or breaking when a linear tensile load is applied to head 483. In other words, webs 491 act as tethers to the legs 487. It is also noteworthy that the thickness at the intersection of shaft 485 to legs 487, adjacent end 489, is considerably greater than any of the adjacent fastener segments; however, using the present three-dimensional printing process, this does not create any undesired internal voids, sink marks, or processing induced shrinkage.

Referring to FIG. 24, a fastener 501 acts as a swivel attachment between a pair elongated workpieces 503 such as fluid carrying tubes or wires. A generally circular workpiece receptacle 505 is located at each end of intermediate body 507. Each receptacle 505 includes an open access 509 defined by a pair of diagonally diverging lead-in walls 511 which allow workpiece 503 to be easily snapped into the predominantly circular cavity inside of receptacle 505.

Intermediate section 507 has a generally cylindrical peripheral shape with an entirely internally disposed interlocking swivel joint 513 therein. Swivel joint 513 includes an enlarged male head 515 projecting from a narrower shaft 517 which extends from a first half of intermediate section 507. An exterior of head 515 is either cylindrical or spherical. Head 515 fits within the matching socket 519 of another half of intermediate section 507. A cross-sectionally C-shaped undercut shoulder 521 peripherally surrounds shaft 517 and prevents head 515 from being linearly extracted from cavity 519. Swivel joint 513 allows receptacle 515 on one side to be rotated about axis 523 relative to receptacle 505 on the opposite side of fastener 501.

Fastener 501 is preferably made by three-dimensionally printing ultraviolet light curable polymeric material, but may alternately be made by direct laser metal sintering of a metallic material. The entire fastener is laid up as a single pre-assembled member during a single machine cycle such that assembly of multiple components after the fastener is created in the printing machine is not required. In this embodiment, one or two pixels of material may bridge between the mating male and female components of swivel joint 513 during the material buildup, however, these bridging areas are either mechanically severed during an initial swivel rotation or are chemically washed away by a solvent or other hardener wash or bath immediately after the laying up and initial curing during the machine cycle.

Figure 25A:
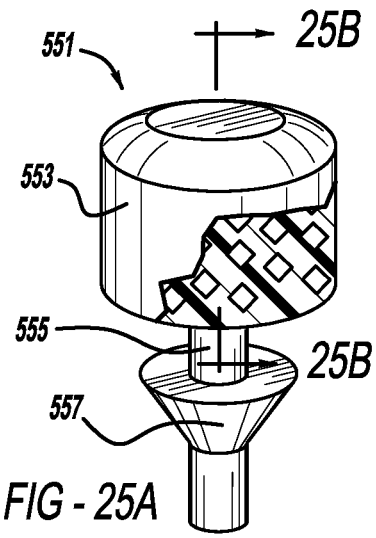
FIG. 25A is a partially fragmented, perspective view showing a fourteenth embodiment fastener.
Figure 25B:
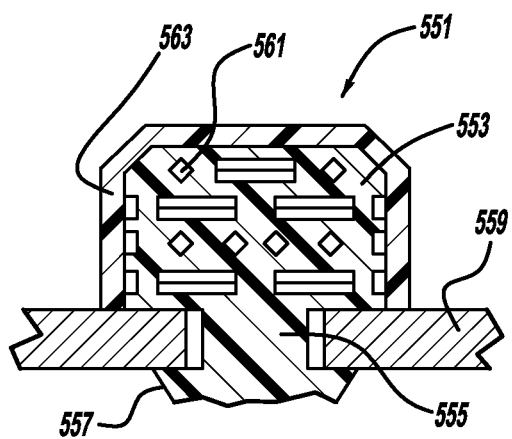
FIG. 25B is a cross-sectional view, taken along line 25B-25B of FIG. 25A, showing the fourteenth embodiment fastener in an installed condition.

Turning to FIGS. 25A and 25B, another embodiment fastener 551 serves as a bumper to cushion an impact. Fastener 551 includes a laterally enlarged head 553 mounted on a longitudinally elongated shaft 555. A frusto-conical attachment formation 557 surrounds shaft 555 and is spaced away from head 553 to allow a workpiece panel 559 to be received therebetween. Alternately, formation 557 can be replaced by threads on shaft 555.

Head 553 includes a plurality of predetermined spaces or pockets 561 internally positioned therein which are completely surrounded by the adjacent polymeric material. Spaces 561 are shown as having a diamond cross-sectional shape but may alternately be a cylinder, cuboid, sphere or a variety of other pre-determined shapes. These allow for compression of head 553 during an impact from a contacting member such as a door, access panel, linkage, or other moveable member. A different material is used to provide an outer shell 563 surrounding at least a majority of head 553. This different material 563 is preferably a polymeric material having a different characteristic than the remainder of head 553. For example, shell 563 may have ultraviolet-fade resistance and aesthetically pleasing color while the remainder of the fastener has a less expensive and non-fade resistant polymeric material. Optionally, shell 563 may be of a softer and more resilient material than the remainder. The materials surrounding spaces 561 can also be of a more resilient material than shaft 555 and attachment formation 557. The entire fastener 551 is preferably three-dimensionally printed as a single piece.

Figure 26:
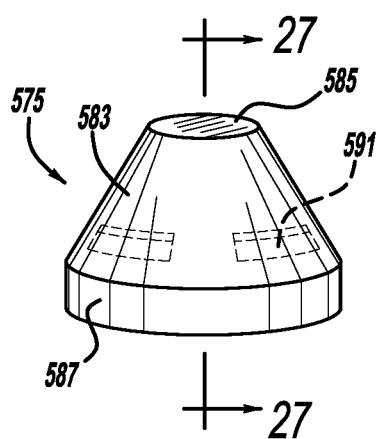
FIG. 26 is a perspective view showing a fifteenth embodiment fastener.
Figure 27:
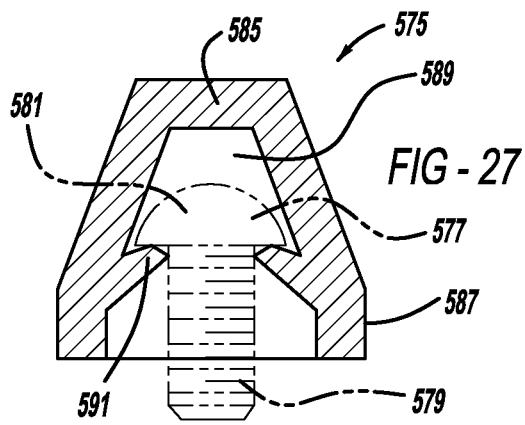
FIG. 27 is a cross-sectional view, taken along line 27-27 of FIG. 26, showing a fifteenth embodiment fastener in an installed condition.

FIGS. 26 and 27 illustrate a fastener 575 which serves as an aesthetically pleasing cap over a screw 577 having a threaded shaft 579 and a laterally enlarged head 581. Fastener 575 preferably has a frusto-conically tapering sidewall 583 ending at an enclosed end 585. An opposite and cylindrically enlarged end 587 is openly accessible and includes receptacle cavity 589 therein. Multiple snap fingers 591 inwardly extend from cap 583 and engage the underside of head 581 from inserted screw 577. It is noteworthy that a die-lock condition, using conventional dedicated tooling, would be present between fingers 591 and wall 583. But with the present three-dimensionally printed or direct laser metal sintered processes, such a conventional problem is avoided.

Figure 28:
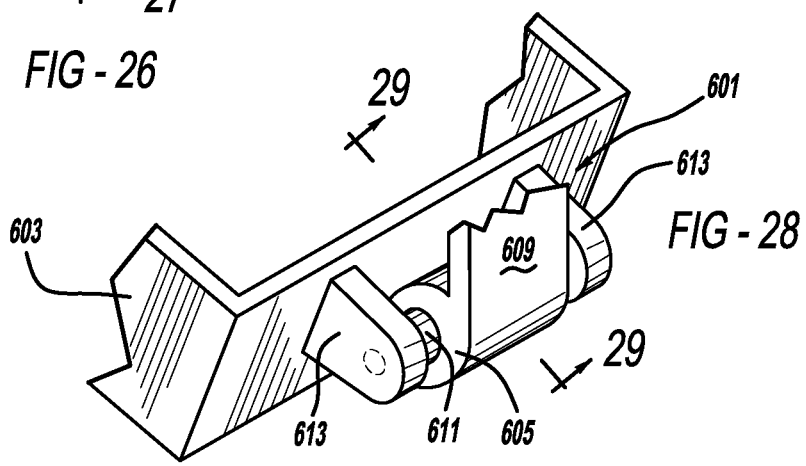
FIG. 28 is a partially fragmented, perspective view showing a sixteenth embodiment fastener.
Figure 29:
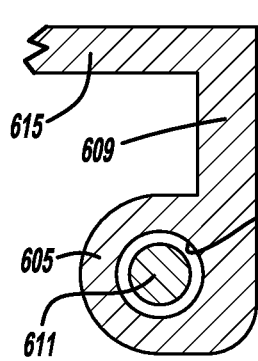
FIG. 29 is a cross-sectional view, taken along line 29-29 of FIG. 28, showing the sixteenth embodiment fastener.

Referring to FIGS. 28 and 29, a fastener 601 is a hinge between two attached members such as a base workpiece 603 and a lid workpiece 605. Fastener 601 has a generally cylindrical collar 605 with a through bore 607. A body 609 upwardly extends from collar 605 and is connected to lid workpiece 615 at an end thereof. Furthermore, an elongated metal rod 611 extends through bore 607. Ends of rod 611 are attached to tabs 613 extending from base workpiece 603 of opposite ends of fastener 609. Collar 605 operably rotates about rod 611 during opening motion of the lid relative to the base. Hinge-fastener 601 is preferably made by three-dimensionally printing an ultraviolet curable polymer, or alternately a three-dimensionally printable metal or direct laser metal sintered process, which is preferably later assembled onto rod 611, or ultimately simultaneously built up with rod 611 in the same machine cycle.

Figure 30:
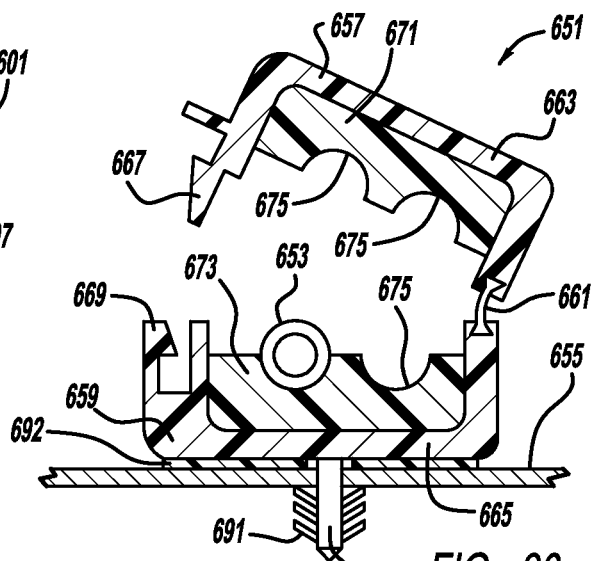
FIG. 30 is a cross-sectional view showing a seventeenth embodiment fastener in a partially installed condition.
Figure 31:
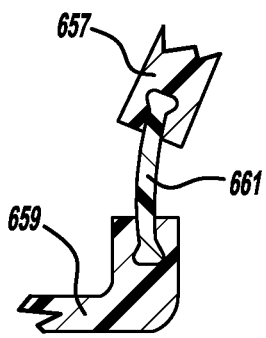
FIG. 31 is an enlarged cross-sectional view through a hinge area showing the seventeenth embodiment fastener.

Another embodiment fastener 651 is shown in FIGS. 30 and 31. In this exemplary configuration, a hose clamp or wire clamp fastener is provided so as to fasten elongated workpieces 653, such as hollow tubes or wires, to a sheet metal or other workpiece panel 655. Fastener 651 has an upper component 657 and a lower component 659, coupled together by a living hinge 661, more particularly upper component 657 includes a rigid outer shell 663 and lower component 659 includes a rigid outer shell 665, both preferably three-dimensionally printed from a rigid and durable polymer. Barb snap fits 667 and 669 disengagably mate with each other to connect segments 657 and 659 together when closed. The snap fits may optionally be integrally printed from a more flexible material than the remainder of the connected shells. A more resilient and compressible three-dimensionally printable polymer is used to create an integral receptacle 671 and 673 within upper and lower components 657 and 659, respectively. When closed, these receptacles 671 and 673 together define generally circular workpiece receivers 675 therebetween to firmly engage the outside of tubular workpieces. Furthermore, a shaft 689 externally extends from lower component 659 and includes multiple legs or wings 691 diagonally projecting therefrom for engagement through a hole in workpiece 655. Shaft 689 and wing 691 are integrally formed as part of lower component 659 although legs 691 may be three-dimensionally printed from a polymer that is more flexible than shaft 689 and the outer shell of lower component 659. A seal 692 is printed integral with shell 665 but from a more resilient polymer.

Living hinge 661 is three-dimensionally printed from a very flexible yet durable polymer integral with components 657 and 659. Each end of living hinge 661 is enlarged and coupled within a cavity of the associated component in a dove-tail manner so as to mechanically resist pull out from the more rigid adjacent shells. Again, the entire fastener 651 is built up as a single and integrated part in a generally simultaneous manner in a single machine cycle, yet has multiple different materials all with a different functioning of sections thereof.

Figure 32:
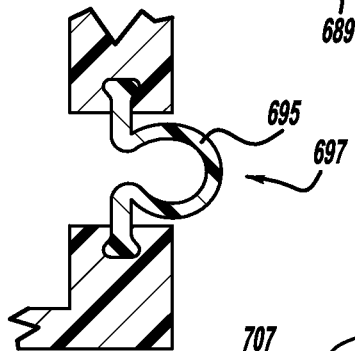
FIG. 32 is an enlarged cross-sectional view showing a different hinge area of an eighteenth embodiment fastener like that of FIG. 30.

FIG. 32 shows another configuration of a living hinge 695 in another embodiment fastener 697. This living hinge has a somewhat circular middle section with outwardly offset ends for coupling to the shells, such that the overall shape resembles Ω. Such a shape encourages greater opening flexibility while also allowing for some misalignment of the mating components. Living hinge 695 on this exemplary embodiment, is also preferably three-dimensionally printed from an ultraviolet curable polymer.

Figure 34:
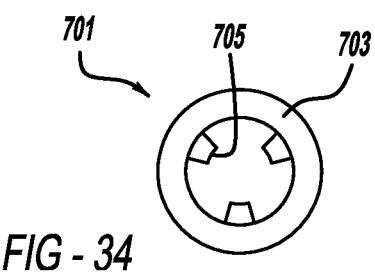
FIG. 34 is an end elevational view, showing the nineteenth embodiment fastener.
Figure 33:
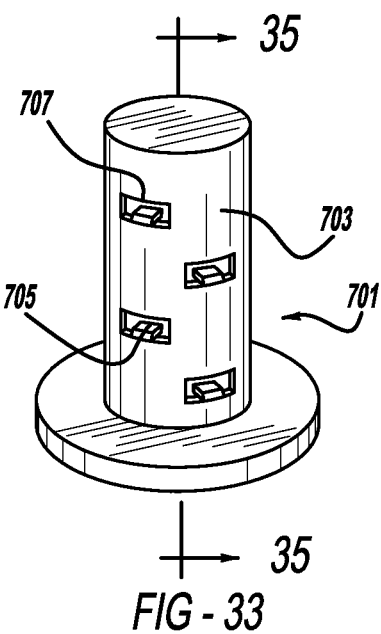
FIG. 33 is a perspective view showing a nineteenth embodiment fastener.
Figure 35:
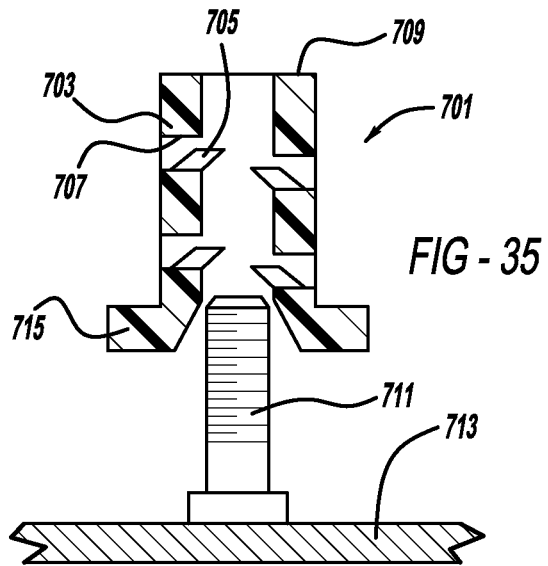
FIG. 35 is a longitudinal sectional view, taken along line 35-35 of FIG. 33, showing the nineteenth embodiment fastener exploded from a mating weld stud.

FIGS. 33-35 show still another embodiment fastener 701. Fastener 701 includes a cylindrical and hollow body or shaft 703 within which extends multiple, spaced apart engagement fingers 705. Openings 707 are preferably disposed adjacent each finger 705 to reduce part weight and material cost, but are alternately not present since three-dimensional printing does not require die access to create such fingers.

Each finger is diagonally oriented toward a distal end 709 such that fastener 701 can be linearly pushed onto an externally threaded weld stud 711, which is welded to a sheet metal workpiece panel 713, such as an automotive vehicle body panel. A flange 715 laterally extends from body 703 to provide a contact surface for an adjacent workpiece, such as an electrically conductive eyelet, or an interior trim panel when clamped between flange 715 and workpiece panel 713 during full installation. The engagement between fingers 705 and threads of stud 711 serve to retain the fastener thereupon, but counter-rotation of fastener 701 will allow for removal of the fastener from the stud. As an alternate configuration, a hexagonal pattern can be externally provided on body 703 to allow for tool access whereby fastener 701 acts as a nut. Preferably, three-dimensional printing allows for fingers 705 to be made of a different polymeric or metallic material than the remainder of the fastener.

Figure 37:
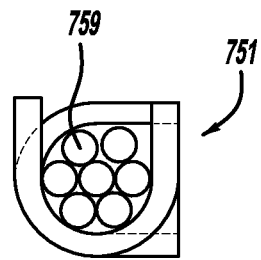
FIG. 37 is an end elevational view showing the twentieth embodiment fastener in an installed condition.
Figure 36:
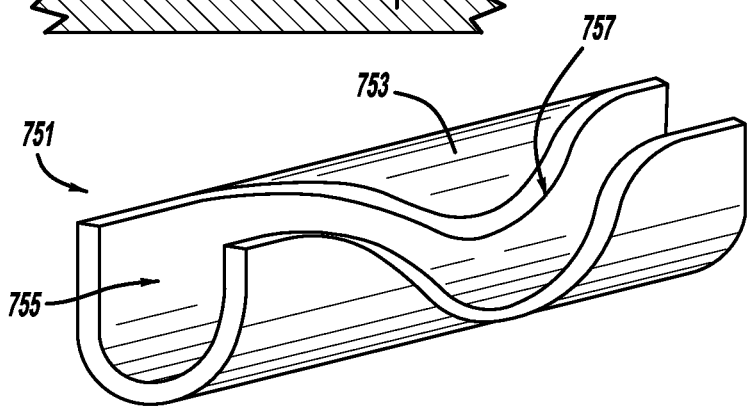
FIG. 36 is a perspective view showing a twentieth embodiment fastener.

FIGS. 36 and 37 show a fastener 751 having an elongated body 753 three-dimensionally printed from an ultraviolet curable polymer. A bore 755 extends throughout the length of body 753 and is accessible via an arcuate slot 757 extending from one end to the other of body 753. Multiple elongated workpieces 759, such as wires, are bundled together and held by body 753. When viewed from an end (see FIG. 37), body 753 defines a closed shape. Moreover, such a wire bundling fastener can be used in a residential, industrial or laboratory building, in an aircraft, boat or automobile.

Fastener 751 is preferably built up by a three-dimensionally printing process with either a polymeric, or alternately, metallic material. Alternately, fastener 751 can be built up from a direct laser metal sintering process. Such processes synergistically create the arcuate shape gap 757 without expensive dedicated tooling and the associated traditional die lock problems. Furthermore, the specifically desired gap shapes and fastener dimensional sizes can be easily customized depending on the quantity of workpieces to be bundled and retained, by merely changing digital data on a computer controlling the machine, without the need to change tooling.

Figure 38:
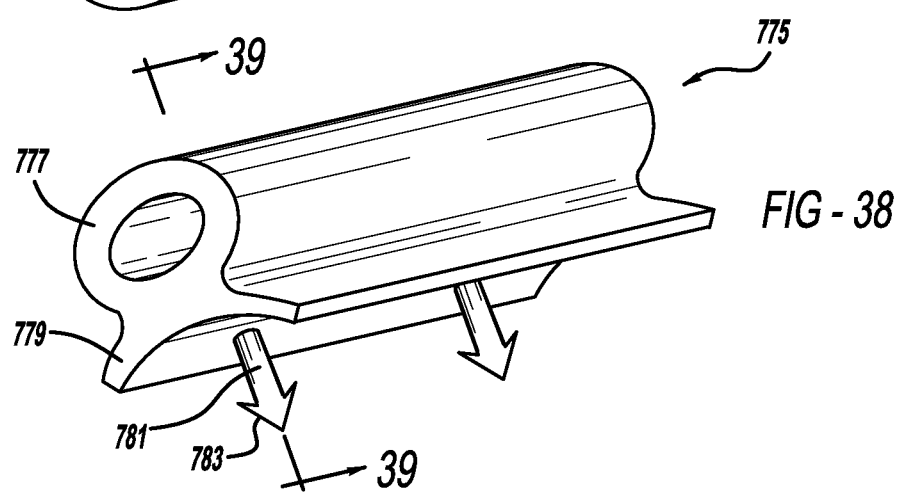
FIG. 38 is a perspective view showing a twenty-first embodiment fastener.
Figure 39:
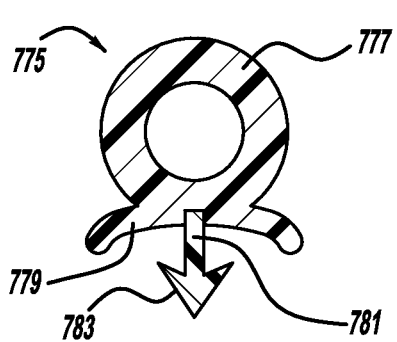
FIG. 39 is a cross-sectional view, taken along line 39-39 of FIG. 38, showing the twenty-first embodiment fastener.

A weatherstrip fastener 775 is illustrated in FIGS. 38 and 39. Fastener 775 includes an elongated and hollow weatherstrip sealing section 777 integrally attached to a curved flange 779. Multiple stems 781 project from the bottom of flange 779 with each containing a pair of barb-like snap-in legs 783 from the distal end thereof. Fastener 775 is entirely created by three-dimensional printing of ultraviolet curable polymeric materials with stems 781 being of a rigid polymer exhibiting a greater tensile strength than the collapsible bulb of weatherstrip section 777. Legs 783 and flange 779 require some resilience and may be optionally made of yet a different polymer than the remainder depending on the specific features needed for each application.

Figure 40:
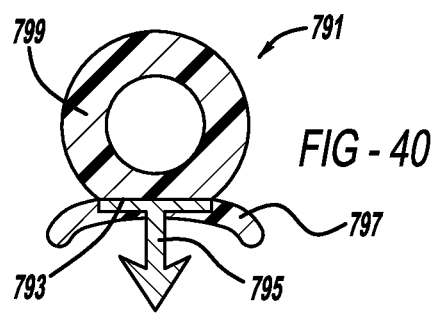
FIG. 40 is a cross-sectional view, like that of FIG. 39, showing a twenty-second embodiment fastener.

Another configuration of a weatherstrip fastener 791 can be observed in FIG. 40 which is essentially the same as that of FIGS. 38 and 39, however, a flange 793 laterally extends from shaft 795 and is entirely encapsulated within flange 797. This construction provides greater mechanical retention of the barbed stem within the weatherstrip section 799 to further deter undesired separation therebetween. Weatherstrip fastener 791 is preferably three-dimensionally printed of an ultraviolet cured, first polymer for the weatherstrip section and a second, different polymer for the panel fastening section.

Figure 41:
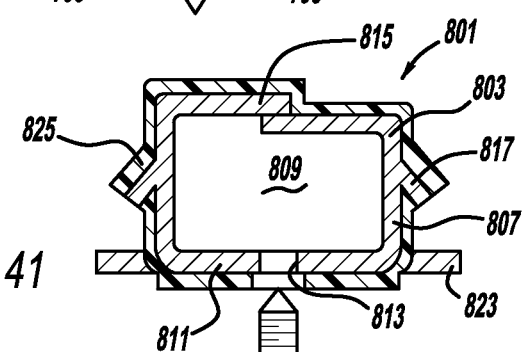
FIG. 41 is an exploded cross-sectional view showing a twenty-third embodiment fastener.
Figure 42:
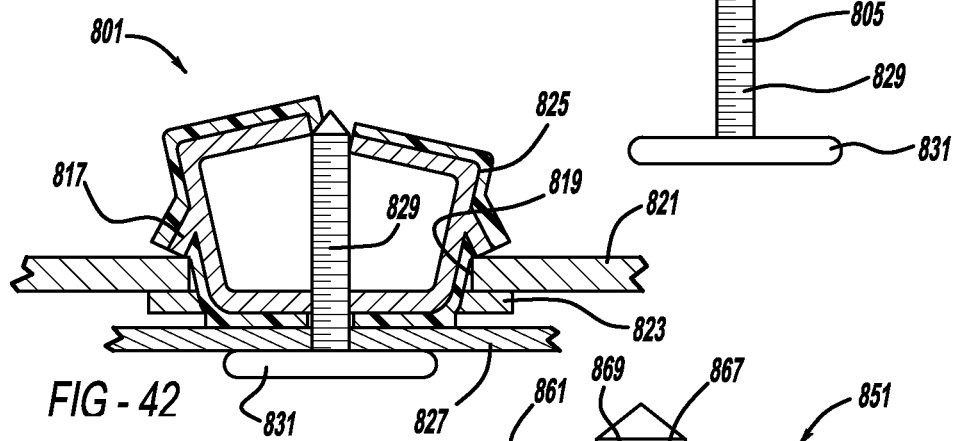
FIG. 42 is a cross-sectional view, like that of FIG. 41, showing the twenty-third embodiment fastener in a fully installed condition.

Referring to FIGS. 41 and 42, another embodiment of a fastener 801 employs a box nut component 803 and a threaded male component such as a screw 805. Box nut component 803 has multiple walls defining a generally square or boxlike cross-sectional shape with a hollow center 809. A base wall 811 has an internally threaded aperture 813. Furthermore, an opposite pair of end walls 815 are configured in an overlapping manner. Diagonally extending legs 817 outwardly extend from side walls 807 so as to snap into a hole 819 and securely engage a backside surface of a workpiece panel 821 trapped between it and a laterally extending flange 823 co-planar with base wall 811. At least side walls 807 and the majority of legs 817 are covered by a resilient and anti-rattling polymeric material layer 825 so as to deter vibration and rattling of box nut component 803 against workpiece 821. Layer 825 extends across base wall 811 to create a seal against the workpieces.

Screw 805 includes a threaded shaft 829 projecting from a flange or head 831. After initial insertion, screw 805 is engaged with a supplemental workpiece panel 827 when shaft 829 enmeshes with aperture 813. Screw 805 is then fully inserted to the position of FIG. 42 such that an end of screw 805 pushes apart and outwardly expands side walls 807 so as to firmly secure legs 817 to workpiece 821. Box nut 803 is preferably three-dimensionally printed from either a polymeric or metallic material substantially simultaneously in the same machine cycle with a more resilient outer layer 825.

Figure 44:
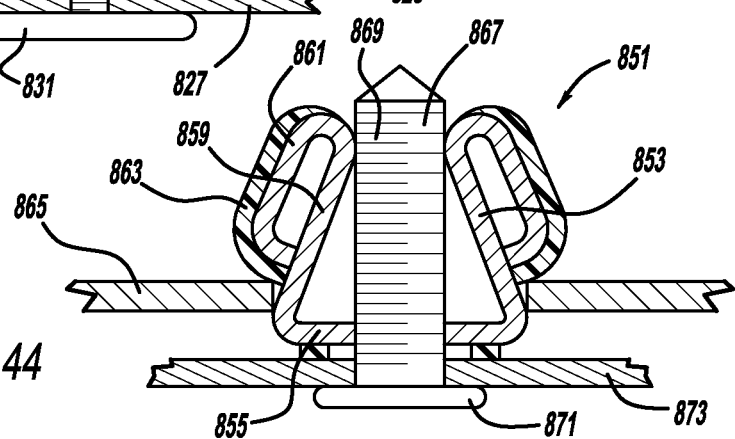
FIG. 44 is a cross-sectional view showing the twenty-fourth embodiment fastener in an installed condition.

Referring to FIGS. 43 and 44, a fastener 851 functions similarly to the immediately prior embodiment fastener, however the present fastener 851 has a generally triangular or pinched U-shaped nut component 853 defined by a base wall 855 with a threaded aperture 857 therein. Nut component 853 is further defined by a pair of inwardly angled side walls 859 and outwardly turned legs 861. Legs 861 are each externally covered by a more resilient and anti-rattling layer 863 which operably engages a workpiece panel 865. When a threaded screw component 867 is fully inserted into nut component 853, male shaft 869 pushes apart side walls 859 and the associated snap-in retention legs 861 thereby securing fastener 851 to workpiece 865. A head 871 of screw 867 traps an auxiliary workpiece panel 873 between it and base wall 855. Screw 871 can be rotated to disengage it from nut component 853 thereby allowing removal of fastener 851 from workpieces 865 and 873. Nut component 853 is preferably three-dimensionally printed from a polymeric, or alternately metallic material essentially simultaneously in the same machine cycle as the more resilient polymeric layer 863.

FIG. 45 shows a cage nut fastener 901 including a base 903 having inwardly turned end walls 905 defining a cage-like cavity 907 therein with enlarged opening 911 between ends of walls 905. A hole is in base 903. Base 903 is preferably welded or otherwise attached to a sheet metal workpiece. A nut component 913 includes a laterally enlarged flange 915, having a generally rectangular periphery moveable trapped by end walls 905. An internally threaded barrel 917 longitudinally protrudes from flange 915 and operably receives an externally threaded shaft 919 of a threaded fastener, such as a bolt 921. A seat belt anchor, or other workpiece is held to barrel 917 by bolt 921 when inserted therein. Cage nut fastener 901 is preferably made by three-dimensionally printing a light curable polymeric or metallic material.

FIG. 46 shows a variation of cage nut fastener 901 wherein resilient and softer polymeric layers 923 and 925 are integrally printed with the more rigid and durable cage walls 903 and nut flange 915, respectively. This variation provides an anti-rattling feature that also allows layers 923 and 925 to be compressed thereby creating a locking condition when bolt 919 is firmly tightened to barrel 917.

Another embodiment fastener is shown in FIGS. 47 and 48. This fastener 951 includes a female base or grommet component 953 and a male insert component 955. Grommet component 953 has a laterally enlarged circular flange 957 from which extends a somewhat cylindrical (when in the installed but not fully secured condition shown in FIG. 47) shaft 959. A pair of moveable wings or legs 961 are flexibly attached to sides of body 959 adjacent a distal end 963 thereof. Each leg has an arcuate inner surface with an inwardly enlarged section 965. Furthermore, an internally threaded and integral insert section 967 is located in body 959 adjacent end 963.

Male insert component 955 includes a laterally enlarged flange or head 969, with a generally circular periphery, and a longitudinally elongated shaft 971. Shaft 971 has an externally threaded end 973 which enmeshes with threaded insert section 967 of body 959. Moreover, a laterally enlarged bulbous formation 975 bordered by indented formations 977 are provided along an intermediate section of shaft 971 so as to allow legs 961 to inwardly collapse when in the nominal and pre-secured position (FIG. 47). However, when screw 955 is torqued into full engagement and in a fully secured position as shown in FIG. 48, cylindrical external surface 979 of body 959 outwardly pushes and locks legs 961 into their fastening position against the back side of at least one workpiece 981. This provides for a blind attachment with fastener 951 being solely inserted from a single side of workpiece corresponding with flange 957, with the user only having access to that side. Fastener 951 is preferably three-dimensionally printed from a polymeric material with the male and female components being entirely built up at essentially the same time in the same machine cycle and in a pre-assembled configuration. Less preferably, however, the components can be separately produced and then assembled, although many advantages will not be achieved.

FIGS. 49 and 50, show a fastener 1001 which is a three-dimensionally printed or direct laser metal sintered nut 1003 including an internally threaded body 1005 and an annular and unthreaded shoulder 1007. Additionally, multiple triangularly shaped darts or ribs 1009 are spaced apart from each other, yet radiate outwardly from shoulder 1007. Ribs 1009 provide locating and anti-rotation features that are pressed into a softer workpiece 1011, such as wood, a ductile metal, or a relatively soft plastic. A threaded bolt 1013 is enmeshed with the internal threads of nut 1003 to secure one or more workpieces 1011 therebetween. Nut 1003 may optionally be provided with a laterally extending flange or a separate washer can be employed. Fastener 1001 is preferably produced by a three-dimensional printing process or a direct laser metal sintering process, either from a light curable polymeric or metallic material, depending upon the specific application.

FIGS. 51 and 52 show a J-nut fastener 1025 which secures one or more workpiece panels 1027 therein. Fastener 1025 includes a generally U-shaped body 1029 consisting of a pair of essentially parallel side walls 1031 and 1033, connected by a bridging end wall 1035. In one configuration, all of the wall intersections and corners have sharp angular intersections 1037, without fillets or radii, since rounded intersections are not required with the preferred manufacturing processes as no folding or bending occurs. Additionally, a diagonally diverged lead-in wall 1039 extends from an open end of side wall 1033 so as to assist in entry of workpieces 1027 between walls 1031 and 1033.

An annular nut 1041, having internal threads 1043, is integrally attached to side wall 1033 as a single piece. A wall thickness of nut 1041 is at least twice that of wall 1033. An unthreaded aperture 1045 is aligned with nut 1041 so as to provide access of an externally threaded shaft 1047 of a bolt 1049 extending through hole 1045, openings in workpieces 1027 and enmeshing with threads 1043 of nut 1041. Fastener 1025 is preferably manufactured through built up, light curable polymeric or metallic materials using three-dimensional printing or laser metal sintering processes. In one variation, nut 1041 is made of a different and more rigid material, exhibiting a greater hoop strength hardness, and thread durability, then the remainder of the fastener which can have more flexible and ductile characteristics to allow for variations in workpiece thickness.

FIGS. 53 through 55 illustrate another fastener 1051 which is a wrap-around-type latch or, alternately, an electrical box terminal. Fastener 1051 includes a longitudinally elongated and flat body 1053 with offset flanges or pockets 1055 and 1057 extending therefrom with openly accessible channels 1059 and 1061 created therebetween. Resilient barb-like legs 1063 diagonally protrude in channel 1059 which serve to retain a male workpiece 1065 (or electrical blade) inserted into channel 1059. Pointed edges 1067 project from ends of pocket 1057 to secure a perpendicularly inserted male workpiece 1069 between it and an end wall 1071 of pocket 1055. In one configuration, a band 1073 wraps around a backside of body 1053 to provide additional stiffness across this flat back surface and to allow for flexible inward and outward movement of pocket 1057 relative to body 1053; band 1073 further prevents over-flexure of the connecting end wall 1075 thereof. In an alternate configuration, band 1073 is removed and bridging side walls 1077 are instead directly connected to adjacent edges of body 1053. Fastener 1051 is ideally suited for securing together ninety degree offset wall joints such as can be used in toys, automotive vehicle panels, aircraft or boats.

Fastener 1051 is preferably three-dimensionally printed from a polymeric or metallic material, or may alternately be direct metal laser sintered from a metallic material. The present fastener 1051 advantageously eliminates the traditional need for expensive progressive dies otherwise required to fold over sheet metal. Such conventional folds require radii at all folds and often double-over sheet material, which wastes material, weight and space. The present processes can further synergistically have sharp surface intersections, only require single material thicknesses, do not require dedicated specialized tooling and do not exhibit conventional spring-back problems which lead to undesired part-to-part tolerance variations for traditional folded parts. The present formations may have varying thicknesses but do not cause undesired, internal shrinkage voids or depressed sink marks due to use of the present manufacturing process, as will be discussed in greater detail hereinafter.

Referring to FIGS. 56-58, a further embodiment fastener 1101 is a nut. The nut includes a body 1103 and a longitudinally aligned through bore having internal threads 1105 along a majority surface thereof. The nut further includes shoulder segments 1107 which are circumferentially separated from each other by relief slots 1109. A peripheral surface 1111 has a generally polygonal shape for receiving a wrench or other tool.

A threaded fastener component, more particularly a bolt 1113, has a polygonal head 1115 for engagement by a tool, a laterally enlarged flange 1117, and an externally threaded shaft 1119. Shaft 1119 of bolt 1113 is operably inserted by rotation into the bore of nut 1101 wherein the constricted diameter of shoulders 1107 provide a locking feature interfering with an end portion of threaded shaft 119. Alternately, if shaft 119 is unthreaded, shoulders 1107 may provide a thread cutting function although the shoulders may need to be positioned at a different location within nut 1101. Nut 1101 is preferably made by three-dimensional printing of a metallic or polymeric material, or is made by direct laser metal sintering of a metallic material. With three-dimensional printing, the nut can advantageously be provided with a harder or softer material at shoulders 1107 as compared to body 1103 in an integrated and simultaneously built up manner.

With reference to FIGS. 59-61, another embodiment fastener 1125 is also a nut having a body 1127, internal threads 1129 in a through bore, and raised shoulders 1131. Shoulders 1131 are separated from each other by radial slots 1133 which are located between each pair of adjacent shoulders 1131. Each shoulder has a tapered or angularly offset tooth 1135 on an inward end thereof which operably engages external threads on a shaft 1137 of a bolt 1139 inserted therein. The smaller diameter created by shoulders 1131, as compared to threads 1129, provides a localized thread locking feature between bolt 1139 and nut 1125 when engaged. Nut 1125 is preferably built up by three-dimensional printing of an ultraviolet light curable/fusable metallic or polymeric material, or by direct laser metal sintering of a light curable metallic material. This advantageously provides extremely precise and sharply angled thread peaks and valleys simultaneously with the building up of the nut body.

FIG. 62 illustrates a fastener 1151 including a cap nut 1153 and a washer 1155. Cap nut 1153 includes a body 1157 having a bore with internally disposed threads 1159. A domed or otherwise shaped cap 1161 is located above one open end of the through bore and defines an open area 1163 between body 1157 and dome 1161. Longitudinally and/or laterally extending internal ribs 1165 and 1167, respectively, are optionally provided within space 1163 to strengthen cap nut 1153. An exterior periphery of body 1157 has a polygonal shape, such as a generally hexagonal shape 1169, to receive wrench or other tool. Additionally, a laterally extending flange 1171 projects from a bottom of body 1157.

Washer 1155 has a stepped shape with a lower bearing wall 1173 of an annular shape, a connecting wall 1175 and an upper engagement wall 1177. Engaging wall 1177 fits within a receptacle 1179 internally disposed in body 1157. Engagement wall 1177 and the associated receptacle 1179 may either have bottom view annular shapes or may be localized fingers and cavities which are circumferentially spaced from each other. Receptacle 1179 is laterally and/or longitudinally larger than engagement wall 1177 so as to allow for some limited relative movement therebetween to account for surface variations in a workpiece attached between a bolt 1181 and bearing wall 1173 of washer 1155. Washer 1155 extends slightly below a bottom of body 1157.

Cap nut 1151 and washer 1155 are preferably made by three-dimensional printing of an ultraviolet curable metallic or polymeric material, or may be direct laser metal sintered from a light curable/fusible material. Washer 1155 is essentially simultaneously layered as part of cap nut 1153 and connected thereto during the laying up steps by a at least one pixel of bridging material which is later removed by a mechanical breakage or washing away of the bridging material which is different and dissolvable. Washer 1155 may be the same or a different material than cap nut 1153.

FIG. 63 shows another embodiment fastener 1201 which employs a cap nut 1203 the same as the prior embodiment, however, a washer 1205 has a generally tapered or frusto-conical skirt 1207 for its bearing wall. Skirt 1207 is attached to walls 1209 and 1211 located in an oversized receptacle 1213 like that of the prior embodiment. This fastener 1201 preferably has a more resilient three-dimensionally printable or laser metal sintered material than does cap nut 1203 which is a harder material.

FIG. 64 illustrates a fastener 1223 employing a cap nut 1227 the same as that of FIG. 62. A washer 1229, however, has a bearing wall 1231 of a wavy or undulating pattern connected to an engagement wall 1233 received within an oversized receptacle 1235 of cap nut 1227. A central passage 1237 of washer 1229 can have a smaller diameter than but is coaxially aligned with an internally threaded bore 1239 of cap nut 1227. Passage 1237 initially holds a bolt in an intermediate installation condition for shipping. Bearing wall 1231 essentially covers at least the majority, if not all, of the bottom surface of cap nut 1227. It is envisioned that washer 1229 is three-dimensionally printed or metal sintered from a more resilient and compressible material than the remainder of the fastener such that the undulations can be somewhat flattened to create and maintain a clamp load for anti-loosening of the fastener.

FIGS. 65 and 66 illustrate another embodiment fastener 1251 wherein a cap nut is the same as the prior FIG. 62. A bearing wall 1253 of a washer 1255, however, has at least two diagonally angled locking formations to deter undesired disengagement of a fastened bolt or workpiece. Bearing wall 1253 has a somewhat circular bottom view pattern surrounding a central opening 1257. Each locking section of wall 1253 is angled to easily rotate the mating bolt in an installation direction but resist reverse rotation. It is envisioned that washer 1253 is three-dimensionally printed or metal sintered from a more resilient material than the remainder of the cap nut.

Referring to FIGS. 67 and 68, another variation fastener 1275 includes a cap nut 1277 like that of FIG. 62. Fastener 1275 additionally has a washer 1279 that essentially covers a bottom of cap nut 1277 and has a central opening 1281 coaxially aligned with internally threaded bore 1283 and a body 1285 of cap nut 1277. Furthermore, this washer 1279 has an inwardly and frusto-conically tapered skirt 1287 which angles toward body 1285 and away from adjacent workpiece. Multiple radial slots 1289 separate sections of skirt 1287. This washer is three-dimensionally printed or metal sintered as part of the cap nut.

FIG. 69 shows another variant of a fastener 1301. This fastener can be any of the fasteners disclosed herein, but in this specific example, is shown as a head 1303 of a threaded fastener. Fastener 1301 has a set of markings or indicia 1305 integrally created with a remainder of the fastener in the manufacturing cycle at essentially the same time. In this example, the indicia constitutes a stylized logo or pattern, the manufacturer's name, and a part number and/or date. Such indicia may be raised or depressed relative to the adjacent parts surface and is preferably of a different color than the adjacent surface. This is ideally suited for three-dimensional printing of an ultraviolet curable polymeric, or alternatively metallic, material where a first color material is essentially simultaneously laid up adjacent second or third different color materials in the same laser printing head pass. This avoids the extra cost, tolerance variations and durability concerns with traditional pad printing, co-injection molding or other such traditional processes, all requiring extra steps and specialized tooling. Pixel-by-pixel colored material differences can be placed on a curved or functional surface with ease and durability.

FIGS. 70-72 illustrate another embodiment fastener 1325. In this embodiment, fastener 1325 is a bolt or screw 1327 including a polygonal tool-receiving head 1329, a laterally enlarged flange 1331 and an externally threaded body or shaft 1335. Shaft 1335 has peaks 1337 and valleys 1339 defining the threads which are very precisely constructed with sharply angled intersections 1341, and additional localized formations 1343 to provide a locking structure. These features also apply to a mating nut 1347. The localized locking formations 1343 provide a raised exterior surface protruding slightly above the nominal thread surface thereat such that when the mating threads are enmeshed therewith, they dig in and deform the formation 1343 thereby creating a locking or anti-rotational function to prevent undesired disengagement. The bolt and nut are preferably three-dimensionally printed from a hard and durable polymeric or metallic material, or they may be direct laser metal sintered, but the locking formation 1343 is essentially simultaneously built up from a light curable/fusable and more ductile material.

FIG. 73 shows an alternate variation fastener 1351 having a very precise thread pattern for bolt 1353 and mating nut 1355. In this configuration, repeating sharply intersecting valleys 1357 and peaks 1359 are created on each component. A diagonal intermediate surface 1361 is additionally provided on nut 1355 which interferes with peak 1359 thereby creating a locking and anti-rotational feature. This intermediate interference can be of a localized construction or may be consistently applied to each thread throughout the length of the nut. It is also envisioned that the nut and bolt thread patterns can be reversed depending upon the application. Such a precise thread pattern is ideally suited for three-dimensional printing or metal sintering since there are no part-to-part tolerance variations otherwise occurring due to traditional molding shrinkage, coldheading tool wear or the like.

Figure 74:
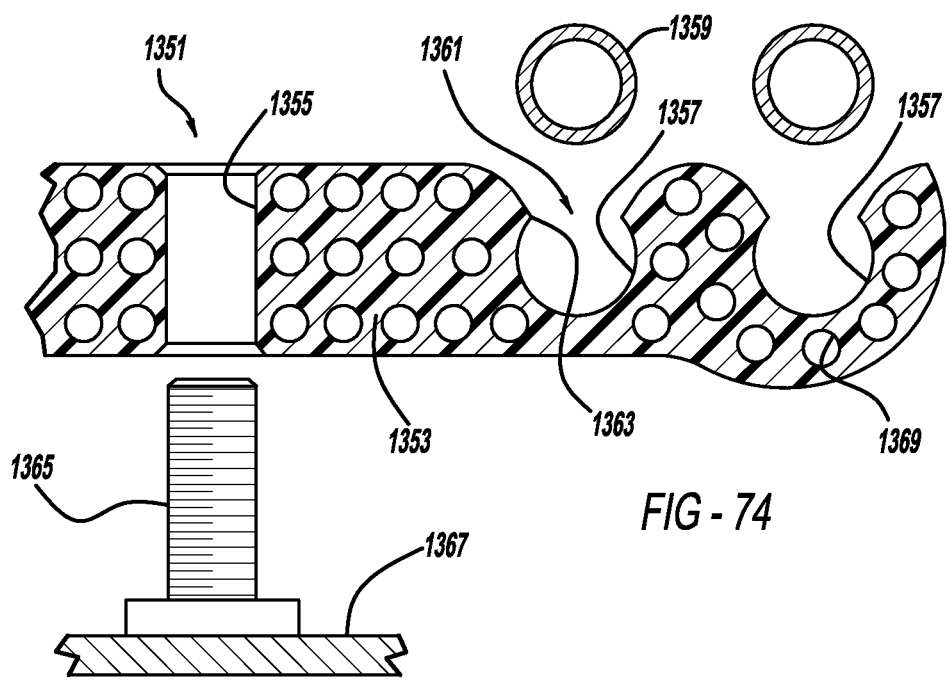
FIG. 74 is a cross-sectional view showing a fortieth embodiment fastener.

With reference to FIG. 74, a fastener 1351 has a body 1353, a through bore 1355 and a pair of workpiece-receiving receptacles 1357. Receptacles have a predominantly circular shape and are accessible by elongated workpieces 1359 through an access channel 1361 defined by compressible or flexible fingers 1363. Thus, workpieces 1359 are snap-fit into receptacles 1357 with easier effort than is required to remove them back through access channel 1361.

Through bore 1355 receives a weld stud 1365 attached to a workpiece panel 1367. A nut or other fastener is thereafter attached to an end of stud 1365 after insertion of fastener 1351 thereon. Exemplary elongated workpieces 1359 include wires, tubes or the like. Internal spaces 1369, of a predetermined shape and position, are located within body 1353 to allow for compression of fingers 1363, lower weight of fastener 1351, a reduction in material costs and increased part flexure. These spaces may be elongated, spherical, rectangular or have varying shapes and locations depending upon the part flexure desired at the adjacent location. Creation of such predetermined and desirable spaces is ideally suited for three-dimensional printing or metal sintering.

Referring to FIGS. 75 and 77, another embodiment fastener 1371 employs an enlarged and generally circular head 1373 from which extends a longitudinally elongated shaft 1375. Multiple legs or wings 1377 circumferentially project in an arcuate manner from adjacent outboard edges 1379 of shaft 1375. At least a majority of each wing 1377 has a distal and longitudinally elongated edge 1381 which is spaced from a facing edge of the adjacent wing of the same side of shaft 1375. An undercut and hollow cavity 1383 is created on each side and defined between an inwardly facing surface 1385 of each wing 1377 and an adjacent outwardly facing surface 1387 of shaft 1375. Each cavity 1383 is openly accessible from a top edge of each wing and from the elongated gap between edges 1381. The wings are each connected together where they intersect shaft 1375 adjacent a tapered and generally pointy distal end 1389. The wing configuration allows for inward flexure of these bifurcated workpiece-engaging formations 1377 as the body of fastener 1371 is linearly pushed into a workpiece hole 1391. After the wings are fully inserted, they will outwardly expand to their nominal condition shown as 1377' wherein a workpiece panel is secured between an upper edge of wings 1377 and a bottom surface of head 1373. Fastener 1371 is three-dimensionally printed from a light, curable polymeric material which allows for easy creation of wings 1377 and cavities 1383 without complicated and expensive, dedicated tooling.

With references to FIGS. 76 and 77, a further embodiment fastener 1393 is the same as the preceding embodiment, however, the wing configuration is different. A shaft 1395 longitudinally extends from a bottom surface of a laterally enlarged and circular head 1397. A pair of wings 1399 each arcuately extend from a single outboard edge 1401 of shaft 1395. A distal edge 1403 of each wing 1399 is spaced from the opposite outboard edge of shaft 1395 such that a longitudinally elongated gap is defined therebetween. An undercut and hollow cavity is similarly defined between each interior surface of wing 1399 and the upward facing surface of shaft 1395 thereby allowing inward flexure of wings 1399 during workpiece insertion. This fastener is also three-dimensionally printed from a light curable polymer.

Figure 78:
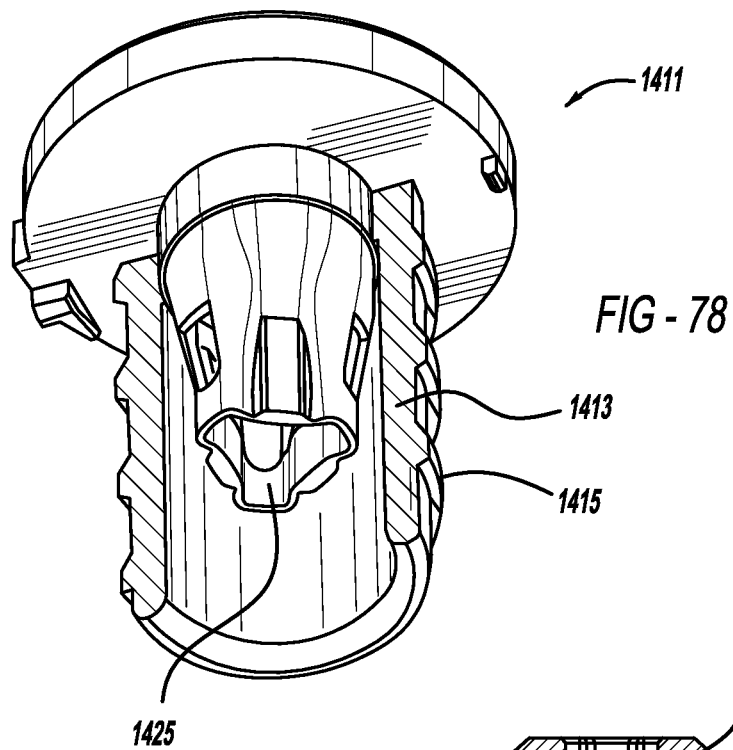
FIG. 78 is a fragmentary perspective view showing a forty-third embodiment fastener.
Figure 79:
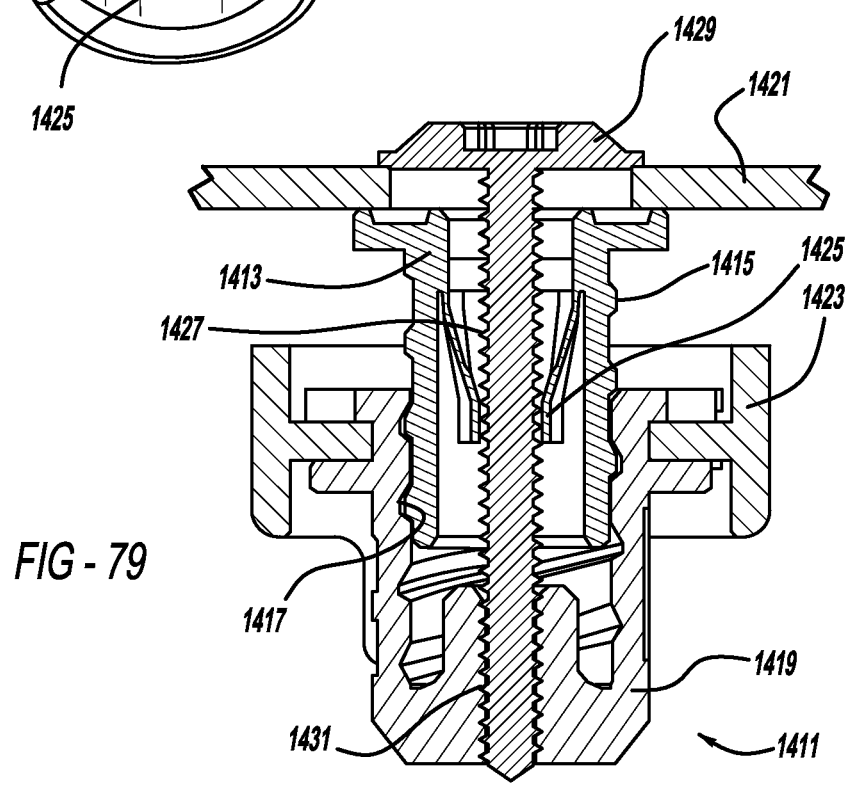
FIG. 79 is a longitudinally sectional view showing the forty-third embodiment fastener.

FIGS. 78 and 79 illustrate another embodiment fastener 1411 used to secure a front bumper skin to a front face of an automotive vehicle. A bushing 1413 includes an external spiral thread 1415 which is engageable with an internal spiral thread 1417 of a nut 1419. This threaded bushing-to-nut engagement provides assembly adjustment to compensate for varying gaps between workpieces 1421 and 1423. A smoothly undulating, inner sleeve 1425 contacts against external threads 1427 of a longitudinally elongated screw 1429 extending therethrough. Threads 1427 enmesh with an internally threaded channel 1431 of nut 1419. The construction and function of this fastener is essentially like that disclosed in U.S. Patent Publication No. 2009/0190993 entitled "Device for Fastening an Add-On Part and a Support Part at a Distance From Each Other" which was invented by De Gelis, and is incorporated by reference herein. In contrast, however, present fastener 1411 is three-dimensionally printed from the same or different, light curable, polymeric materials, depending upon the specific application.

Furthermore, it is also envisioned that bushing 1413 is three-dimensionally printed at least partially inserted in nut 1419 during the manufacturing cycle, with a few pixels of a dissolvable printed material bridging therebetween such that no post-manufacturing assembly is needed between these two components. This partially installed manufacturing configuration is further advantageous by preventing thread misalignment as would potentially occur with conventional components. It is alternately envisioned, however, that these components can be separately printed and later assembled, but such a configuration will not fully take advantage of the cost and labor savings.

Figure 80:
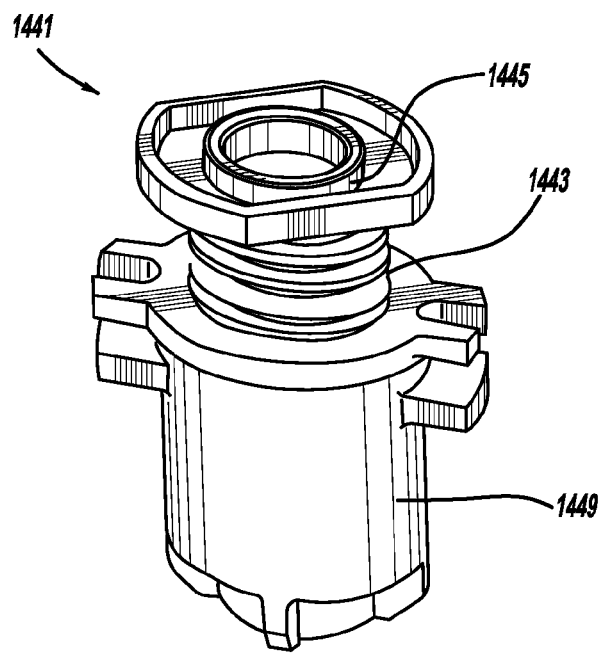
FIG. 80 is perspective view showing a forty-fourth embodiment fastener.
Figure 81:
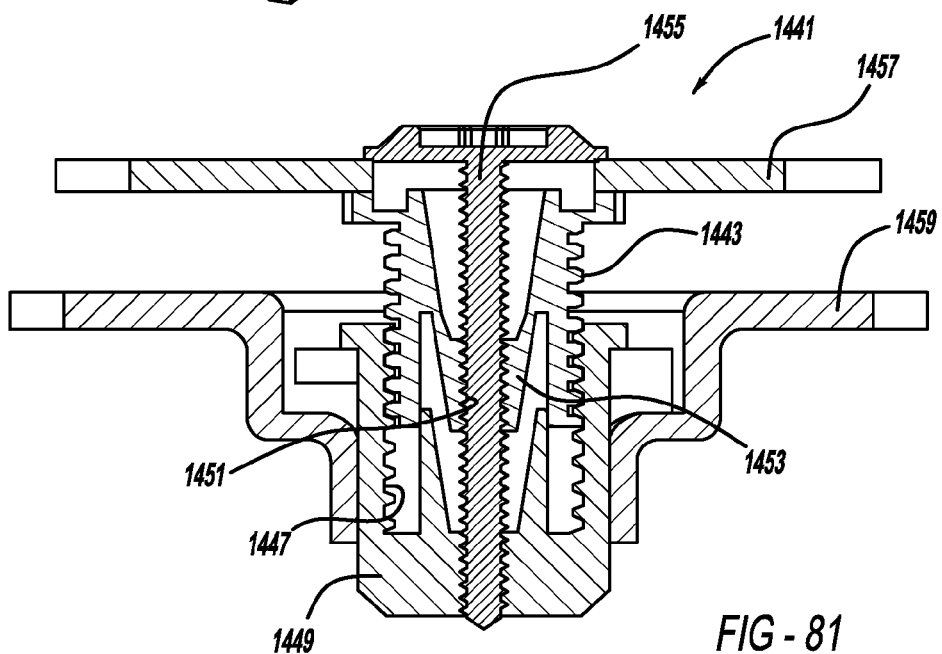
FIG. 81 is a longitudinally sectional view showing the forty-fourth embodiment fastener.

FIGS. 80 and 81 show yet another embodiment fastener 1441. This fastener is similar to that of the immediately preceding embodiment, however, a more aggressive and tightly spiraling external thread 1443 is on a periphery of a bushing 1445. Similarly, the same aggressive and tightly spiraling thread 1447 is located on an internal surface of a nut 1449. Additionally, an internal thread 1451 is located within a sleeve 1453 coaxially positioned inside bushing 1445, within which is engaged a longitudinally elongated screw 1455. Fastener 1441 allows for adjustment between the secured bumper workpieces 1457 and 1459. A traditional injection molded device is disclosed in U.S. Patent Publication No. 2009/0263180 entitled "Device for Securing an Add-On and a Support in Spaced-Apart Relation" which was invented by De Gelis, and is incorporated by reference herein. In contrast, present fastener 1441 is three-dimensionally printed from the same or different, light curably polymers, preferably in a pre-assembled condition or, alternately in a separate condition requiring post-manufacturing assembly. The three-dimensionally printed present fastener advantageously avoids the high cost, complexity and time consuming need for dedicated tooling to create the components thereof, especially to create thread 1451 internal to sleeve 1453.

Figure 82:
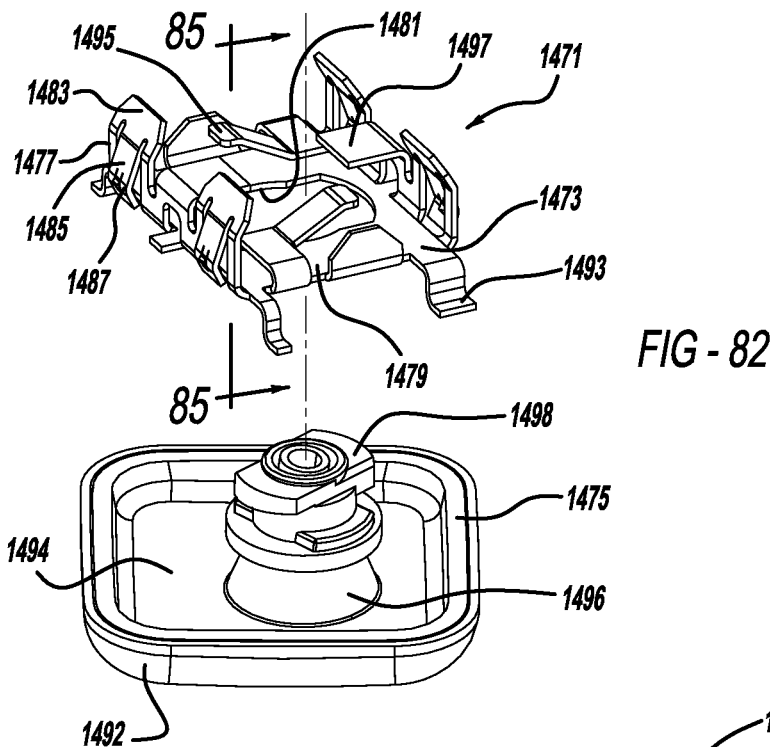
FIG. 82 is an exploded perspective view showing a forty-fifth embodiment fastener.
Figure 83:
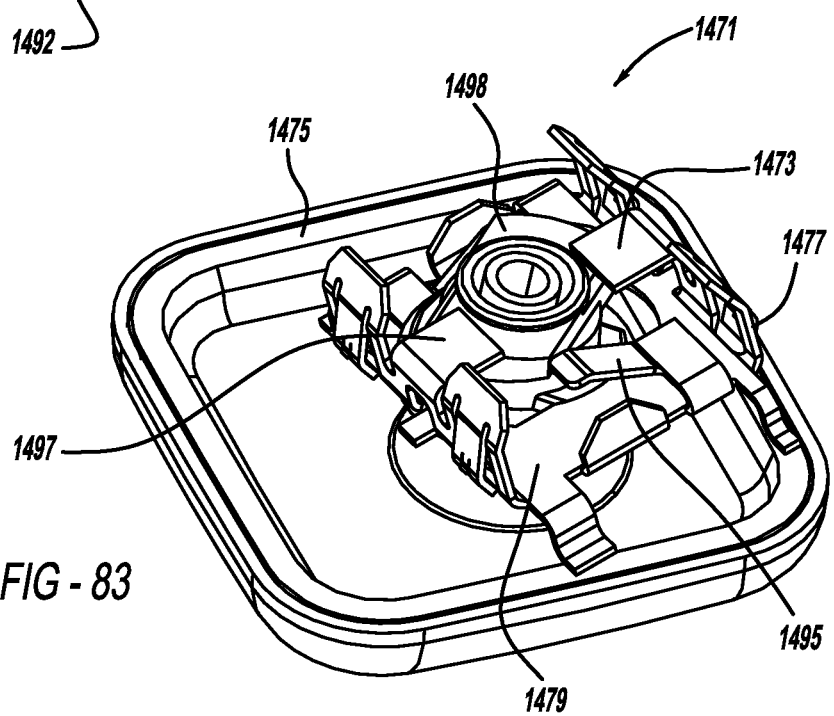
FIG. 83 is an assembled perspective view showing the forty-fifth embodiment fastener in an intermediate installation position.
Figure 84:
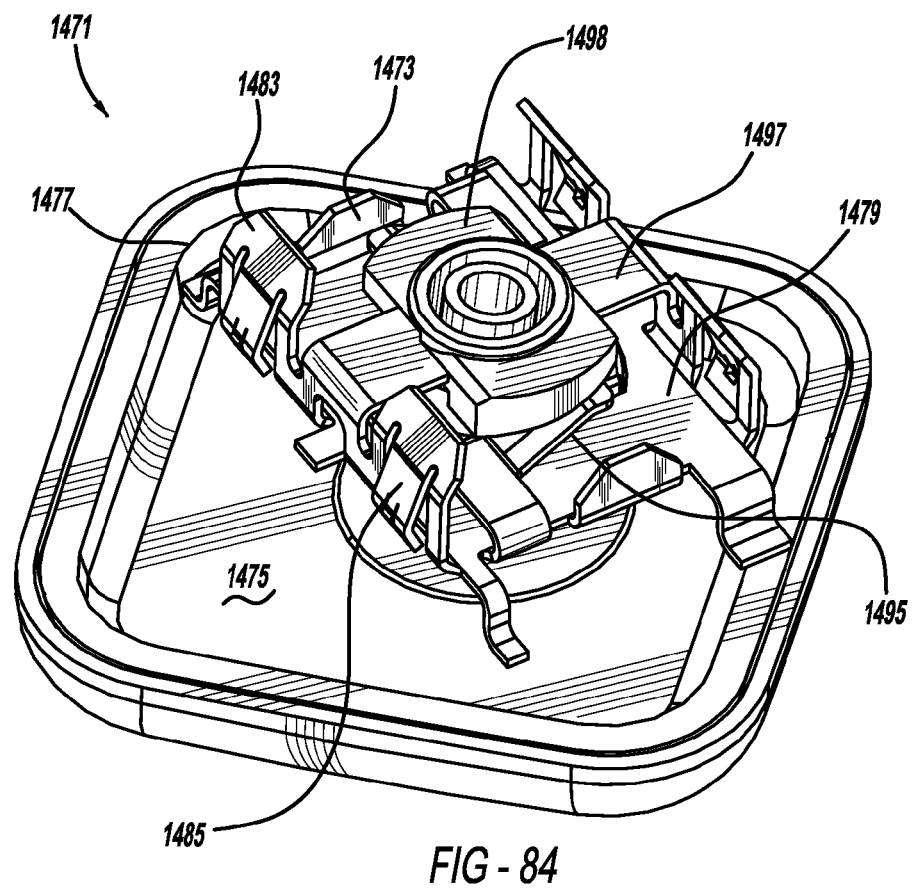
FIG. 84 is an assembled perspective view showing the forty-fifth embodiment fastener in a fully installed position.

A quarter-turn fastener assembly 1471 is shown in FIGS. 82-84. Fastener assembly 1471 includes a clip 1473 and a base 1475. A workpiece, such as a vehicular sun visor, assist handle, or trunk load floor, or a manhole cover, wall bracket or the like, is secured to an adjacent workpiece panel between the clip and base when fully installed.

Clip 1473 includes at least two, and more preferably four, walls 1477 upstanding from a central head 1479 with an aperture 1481 therein. A tapered lead-in section 1483 inwardly angles from each wall 1477. Furthermore, a snap-in leg 1485 includes a pair of inwardly tapered segments intersecting at an intermediate apex 1487 to snap into and then firmly engage a workpiece panel 1491 (see FIG. 85). Multiple feet 1493 laterally and downwardly extend from edges of head 1479 to abut against a second workpiece panel. Moreover, a pair of offset angled and diagonally extending ramps 1495, with a flat distal end thereon, oppositely project from head 1479 on either side of aperture 1481. Additional flanges 1497 inwardly project between pairs of walls 1477.

Base 1475 has an aesthetically pleasing outer surface 1492 and a back side surface 1494. A central shaft 1496 longitudinally projects from surface 1494 and terminates in a laterally enlarged head 1498.

FIG. 83 illustrates base 1475 in an initial position linearly inserted into an opening in one of the workpieces. In this position, tabs 1497 trap and abut against an upper surface of head 1498. Thereafter, the installer rotates clip 1473 relative to base 1475 approximately 90 degrees such that the bottom side of head 1498 rides along the diagonally angled section of each ramp 1495 thereby compressing the ramps toward head 1479. Thereafter, fastener assembly 1471 is linearly snapped into another workpiece panel via engagement of legs 1485. One such traditional construction is disclosed in U.S. Patent Publication No. 2010/0146747 entitled "Clip and Method for Using the Clip" which was invented by Reznar et al, and is incorporated by reference herein. In contrast to this traditional clip, however, the present fastener assembly is preferably three-dimensionally printed from at least two different polymeric and/or metallic materials, or alternately, additively layered using direct laser metal sintering. The present fastener assembly advantageously does not require expensive and complicated dedicated injection molding dies and progressive stamping die.

Figure 85:
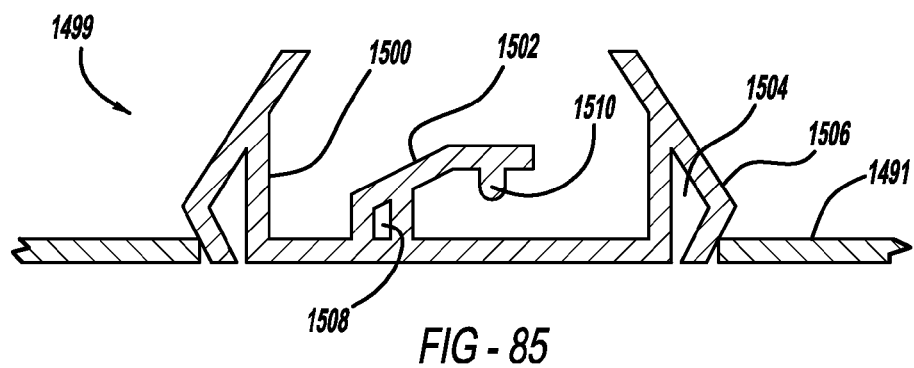
FIG. 85 is a cross-sectional view, taken along line 85-85 of FIG. 82, showing a variation of the forty-fifth embodiment fastener.

FIG. 85 illustrates a variation of this quarter-turn fastener wherein a clip 1499 does not require traditional apertures in solid and unperforated upstanding walls 1500, and does not require complex and unnecessary inwardly bent and folded segments to support ramps 1502 which instead, directly project from one or more vertical walls upstanding from the head inboard of the peripheral edges thereof. Furthermore, die locked cavities 1504 between a multiple angled workpiece engaging leg 1506 and the facing wall 1500, as well as entirely enclosed predetermined spaces 1508, can be easily created by additively depositing, three-dimensionally printable polymeric or sintered metal materials. A compression stop 1510 can be deposited to inwardly extend from a middle area of ramp 1502. Therefore, the present processing provides noteworthy synergistic benefits not found in traditional injection molding and stamping methods.

Figure 87A:
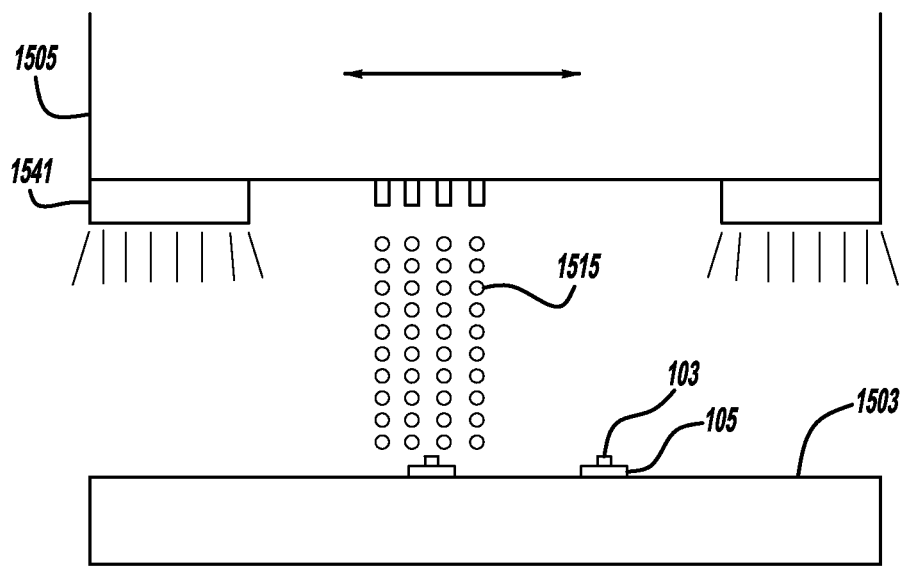
FIGS. 87A-C are a series of diagrammatic side views showing the machine building up the first embodiment fasteners.
Figure 86:
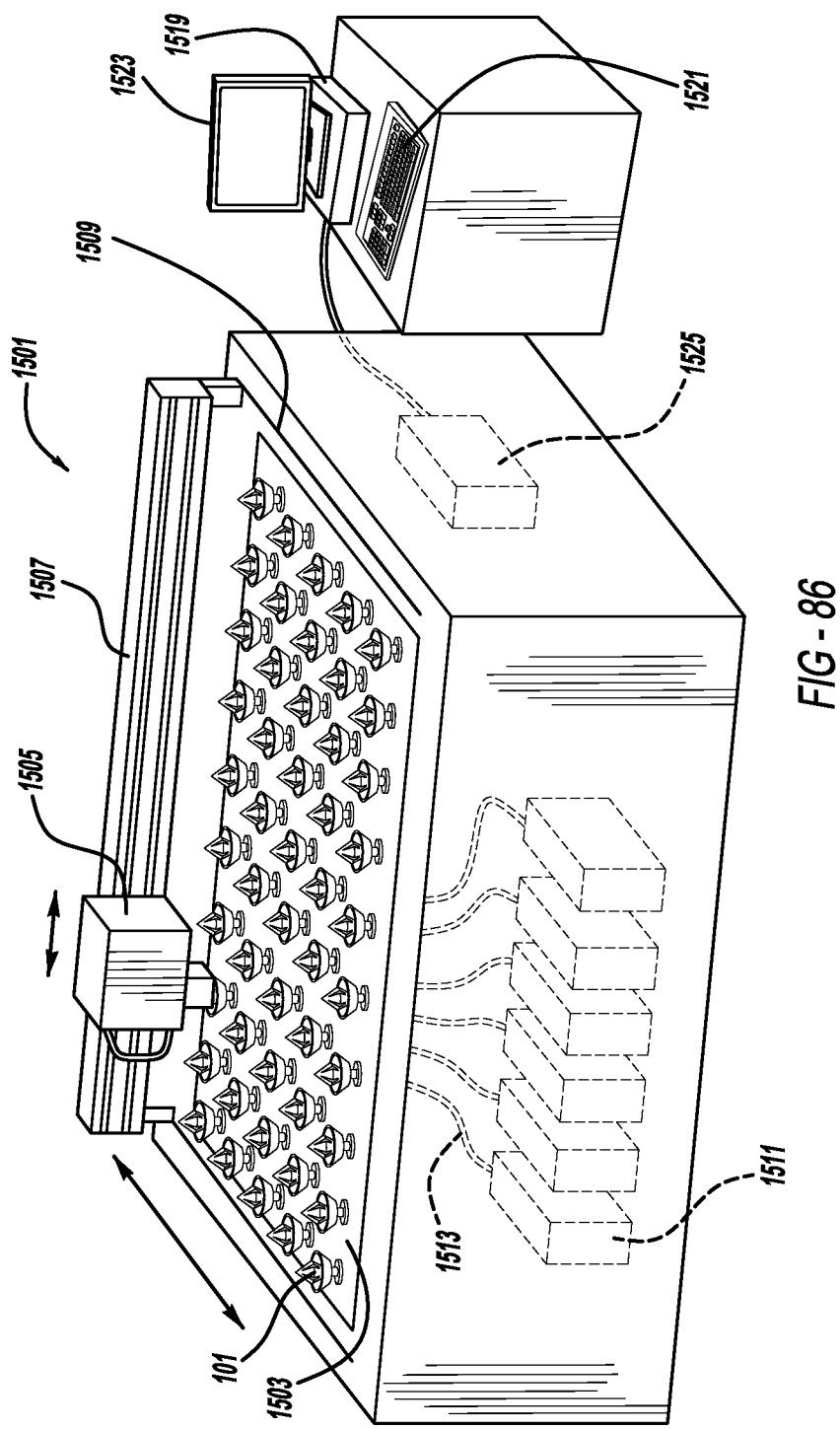
FIG. 86 is a perspective view showing a machine manufacturing the first embodiment fasteners, with an upper cover of the machine removed.
Figure 87B:
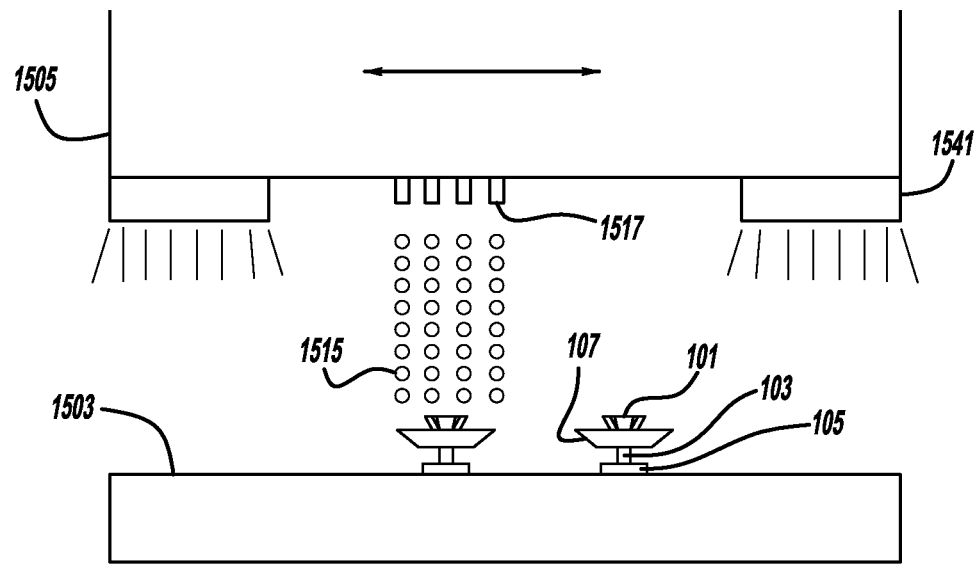
Figure 87C:
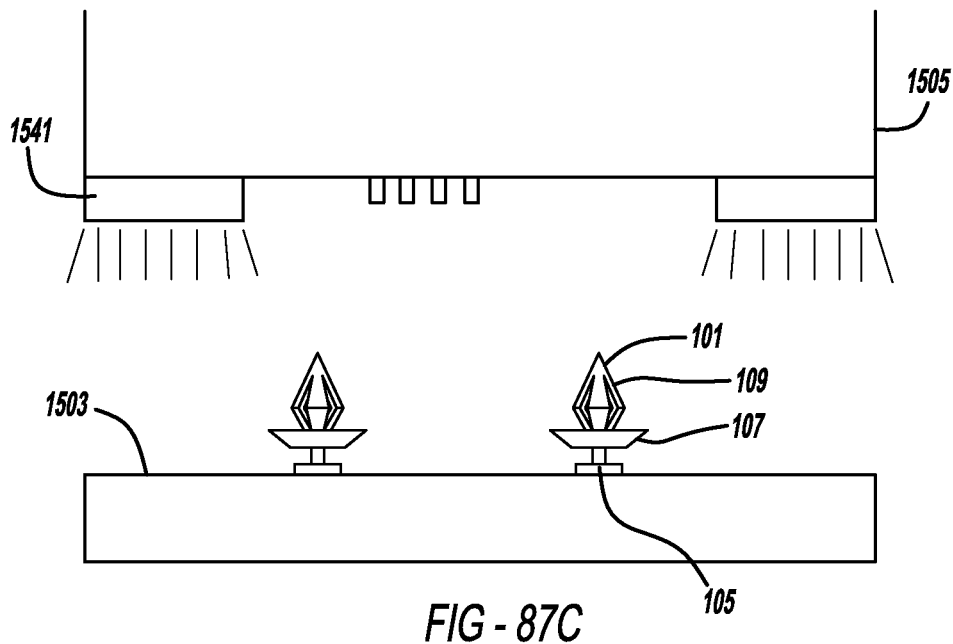

The preferred manufacturing machine and process are shown in FIGS. 86-87C. A three-dimensional printing machine 1501 includes a stationary support surface 1503 upon which a set of identical fasteners 101 are created. Machine 1501 further includes at least one ink jet printer head 1505, and preferably eight heads, which traverse side to side along one or more gantry rails 1507 by an electric motor or other automatically controlled actuators. The gantry rail also moves fore and aft above support surface 1503 along outboard tracks 1509, driven by an electric motor or other automatically controlled actuator. At least two storage tanks 1511 or removable cartridges are connected to head 1505 via supply hoses 1513 in order to feed the same or different polymeric materials 1515 contained within each tank 1511 to multiple ink jet printer openings 1517 in head 1505. Openings 1517 may constitute an array of 10×10 or even 100×100 nozzles, and more preferably 96 nozzles, arranged in a linear array such that multiple material flows are simultaneously emitted during a single head pass. The material is preferably an ultraviolet light-curable photopolymer in the form of a powder and water mixture. Alternately, a spool containing an elongated and flexible string or filament of the polymeric material can be fed to the head, melted and emitted onto the support surface as a layered and continuous string.

A computer controller 1519, having an input keyboard 1521, an output display screen 1523, and a microprocessor, is connected to a central processing unit 1525 of machine 1501 to control the feed of material from tanks 1511 and the actuator movement of head 1505 relative to support surface 1503. The machine user downloads a CAD file containing a design of the fastener into non-transient computer memory, such as RAM, ROM, a hard drive or removeable storage, associated with computer controller 1519. The user then uses software instructions stored in the memory to digitally lay out the desired quantity of the fasteners onto support surface 1503 and position the fasteners in a manufacturing orientation, while adding any supports 1527 or pixel bridges to the design which are later removed after the manufacturing. The user also inputs the material(s) to be used in the manufacturing, whereafter the microprocessor in computer controller 1519 and CPU 1525 runs the software to cause head 1505 to begin its movement and material deposition in order to create the set of fasteners.

During the first pass of head 1505, ink jet printing openings 1517 emit streams of polymeric material 1515 and lay down a first layer, constituting a bottom external surface with a first transverse pass of head 1505; for the first preferred embodiment fastener, the bottom external surface as shown is an outside surface of the thickest section which is at the fastener head. This first pass lays down a material thickness of approximately 0.1-1.0 mm of fastener. As the machine head continues in its transverse path, it will also lay down the same exact material layer for each adjacent fastener being manufactured in the same manufacturing cycle.

Alternately, if the array of openings is large enough, spread out or contained on multiple heads, then multiple heads can be simultaneously deposited. One or more ultraviolet lights 1541 are attached to head 1505 which serve to emit light onto the layered material immediately after its deposition which binds together and cures the layer of material deposited. After the first layer has been deposited for each of the multiple fasteners, head 1505 then emits a second layer of polymeric material 1515 upon the already deposited first layer which is then bound to the first layer when cured by lights 1541. This layering and curing is repeated many times, for example, with more than fifty layers or head passes, until the fastener is fully created.

Material is deposited where computer controller 219 informs head that a wall or other polymeric formation is desired but head will not deposit any material where a bore or other open area is present in the CAD drawing of the fastener. The polymeric material is stacked in many layers thereby creating the entire fastener as an integral and single piece part in an ambient and non-pressurized gaseous, particularly air, environment inside an enclosure of machine 1501. In other words, the fasteners are all surrounded by air except for the first layer which contacts support surface 1503, during the entire manufacturing cycle. As used herein, manufacturing or machine "cycle" refers to the time period from which the head begins depositing the first layer of material until when the head deposits the final layer of material for the completed part and is cured in the machine. After the machine cycle is complete, the user manually removes the manufactured fasteners from support surface 1503, such as by use of a putty knife or other removal tool. At least forty fasteners are made in a single machine cycle, which is preferably less than ninety minutes. In one optional step, each removed fastener is dipped into a hardener, solvent or final curing solution, which also serves to dissolve any supports or bridges, especially when they are made of a solvent-dissolvable material, different from the primary material defining walls of the fastener.

Returning to the manufacture of the embodiment fastener of FIG. 11, the present three-dimensional printing advantageously builds up ribs 279 and skirt 281 of umbrella 277 as a flexible seal essentially simultaneously in the same pass as the adjacent shaft 285 is built up. The umbrella seal is made of a more flexible, UV curable polymer (for one exemplary configuration, DM 9870 material) as compared to the adjacent rigid shaft (for one exemplary configuration, Verogray material). It is noteworthy that the seal is integrally connected and made as a single part with the remainder of the fastener such that post-manufacturing assembly is not required. The seal can also have a dove tail engagement within an undercut of the adjacent shaft thereby providing an additional mechanical connection to provide extra durability.

Exemplary generic three-dimensional printing machines and materials that can be employed to make fastener as specified herein are disclosed in U.S. Patent Publication Nos. 2010/0217429 entitled "Rapid Production Apparatus" which published to Kritchman et al. on Aug. 26, 2010, 2011/0074065 entitled "Ribbon Liquefier for Use in Extrusion-Based Digital Manufacturing Systems" which published to Batchelder et al. on Mar. 31, 2011, and U.S. Pat. No. 7,851,122 entitled "Compositions and Methods for Use in Three Dimensional Model Printing" which issued to Napadensky on Dec. 14, 2010, U.S. Pat. No. 7,369,915 entitled "Device, System and Method for Accurate Printing of Three Dimensional Objects" which issued to Kritchman et al. on May 6, 2008, and U.S. Pat. No. 5,866,058 entitled "Method for Rapid Prototyping of Solid Models" which issued to Batchelder et al. on Feb. 2, 1999. These patent publications and patents are all incorporated by reference herein. A presently preferred machine is the Connex 500 model from Objet Geometries Inc. but may less preferably be a Dimension Elite fused deposition modeling machine from Stratasys, Inc. Nevertheless, it should be appreciated that manufacturing the fasteners disclosed herein by the present three-dimensional printing steps also disclosed herein is a significant leap in technology.

A direct metal laser sintering machine 1601 is shown in FIG. 88. A programmable computer controller 1603 controls vertical and horizontal actuators 1605, a laser light source 1607 and a mirror actuator 1609 in accordance with operating software instructions stored within the computer's memory and CAD data for one or more fasteners to be manufactured. Metallic powder 1611 is contained within the chamber 1613 which is moveable in a three-dimensional manner by actuators 1605. A reflective mirror 1615 moves a laser light beam 1617 emitted from laser 1607 such that beam 1617 interacts with desired points on the chamber full of metal powder 1611. It should also be appreciated that various optics can separate beam 1617 into multiple sub-emissions so as to interact with multiple points of metal powder 1611 at the same time. This laser-to-powder interaction causes a light curing, or more precisely fusing, of the powder particles at that location such that fastener 1025 is built up in a layer-by-layer and additive manner as a single integral part until the entire fastener is thereby created. The computer can be programmed to essentially simultaneously make multiples of the identical part within the same machine cycle. The fastener is not otherwise contained within specialized and dedicated tooling whereby the direct metal laser sintering machine can make any of the fasteners disclosed herein with only programming changes.

One suitable machine is the EOSINT M 280 Model which can be obtained from EOS GmbH of Munich. Exemplary generic machines, not known to produce any fasteners, are disclosed in U.S. Pat. No. 5,658,412 entitled "Method and Apparatus for Producing a Three-Dimensional Object" which issued to Retallick et al. on Aug. 19, 1997; U.S. Patent Publication No. 2009/0017219 entitled "Layer Application Device for an Electrostatic Layer Application of a Building Material in Powder Form and Device and Method for Manufacturing a Three-Dimensional Object" which published to Paasche et al. on Jan. 15, 2009; and U.S. Patent Publication No. 2009/0045553 entitled "Device and Method for a Layerwise Manufacturing of a Three-Dimensional Object from a Building Material in Powder Form" which published to Weidinger et al. on Feb. 19, 2009, all of which are incorporated by reference herein.

While various embodiments have been disclosed herein, and it should be appreciated that other variations may be employed. For example, pre-assembled or separately printed washers, seals or gaskets can be simultaneously made by the layering and building up process of three-dimensional printing as discussed herein with any of the fastener embodiments. It should also be realized that while pre-assembled manufacturing is advantageous, the components may be separately manufactured and assembled although many of the present advantages will not be achieved. Additionally, predetermined and entirely enclosed hollow spaces can be designed and manufactured inside thickened walls of any of the present fasteners in order to save material costs and weight. Any of the fastener functions, features and segments thereof may be interchanged with any of the other fasteners disclosed hereinabove, although certain benefits may not be realized. Nevertheless, such changes, modifications or variations are not to be regarded as a departure from the spirit and scope of the present invention.

The invention claimed is:

1. A method of making a fastener, the method comprising:
   (a) creating a first layer of material to define a first section of a fastener;
   (b) emitting light onto the first layer after the prior step to cure, harden or bond the layer;
   (c) creating a second layer of the material upon the first layer to define a second section of the fastener after the prior step;
   (d) emitting light onto the second layer after the prior step to cure, harden or bond the second layer;
   (e) creating at least a third layer of the material upon the second layer to define at least a third section of the fastener after the prior step;
   (f) emitting light onto the third layer after the prior step to cure, harden or bond the third layer;
   (g) creating a flexible member from the material which is a printed polymeric material, the member being at least one of: (i) an umbrella or (ii) a work-piece engaging leg; and
   (h) removing the finished fastener from a machine which performs the creating and emitting steps, with the layers all being integrally connected to their adjacent layers;
   the finished fastener being functional and made by the machine in less than ninety minutes.

2. The method of claim 1, further comprising depositing the first layer of the material from a printing head onto a support surface of the machine in an ambient and unpressurized air environment.

3. The method of claim 2, wherein the material is a light curable polymer.

4. The method of claim 1, wherein the light is ultraviolet light which is immediately passed over each layer of the fastener after it is deposited.

5. The method of claim 1, further comprising making the flexible workpiece-securing leg, an elongated shaft and a laterally enlarged flange, as part of the creating steps, the head being layered before the leg is layered in the machine.

6. The method of claim 1, further comprising making a threaded shaft with sharply angled thread intersections for at least one of: a peak and a valley, by the creating steps.

7. The method of claim 1, further comprising making a flexible section of the fastener by creating another layer of a different material, the first section being of a more rigid material than the flexible section.

8. The method of claim 1, further comprising creating the fastener in an additive manner as a quarter-turn fastener including inwardly projecting flanges, upstanding walls and the flexible workpiece-engaging legs.

9. The method of claim 1, further comprising creating a first threaded component and a mating second threaded component of the fastener, with the components being additively built-up in an assembled state with their threads engaged, the components being adapted for disassembly from each other after manufacturing in at least one condition.

10. The method of claim 1, further comprising depositing a second and different material integrally connected to the first material during the same machine head pass above the fastener being created.

11. The method of claim 1, further comprising making a predetermined space entirely encapsulated within a section of the fastener.

12. The method of claim 1, further comprising making a spiral thread on the fastener by depositing and light curing the material.

13. A method of using a three-dimensional printing machine, the method comprising:
    emitting material from an ink jet printing head of the three-dimensional printing machine, and building up a fastener by placing the material to create workpiece-retention legs laterally extending from a stem; and
    creating an enlarged fastener head with the building up step;
    wherein the workpiece-retention legs include at least one of: (a) moveable legs adapted to expand on the opposite end of the fastener from the fastener head, or (b) moveable barbs which are tapered toward a longitudinal centerline opposite the fastener head.

14. The method of claim 13, further comprising using the three-dimensional printing machine to create a threaded receptacle of the fastener, including internal threads adapted to retain an elongated threaded shaft at least after the curing.

15. The method of claim 13, further comprising using the three-dimensional printing machine to create a resilient segment from the material which is flexible.

16. A method of using a three-dimensional printing machine, the method comprising:
    emitting material from an ink jet printing head of the three-dimensional printing machine, and building up a fastener by placing the material to create at least one of: (i) a threaded receptacle, (ii) a resilient segment, or (iii) workpiece-retention legs laterally extending from a stem; and
    creating a preassembled shaft located partially within a bore of the fastener during the building up step, the bore being located within a body, the body including workpiece-engaging surfaces, and the shaft being further insertable into the bore after the fastener is manufactured.

17. The method of claim 16, further comprising creating an enlarged head with the building up step, wherein the workpiece-retention legs are created and include at least one of: (a) moveable legs adapted to expand on the opposite end of the fastener from the head, or (b) moveable barbs which are tapered toward a longitudinal centerline opposite the head.

18. The method of claim 13, further comprising building up the fastener on a layer-by-layer basis, the machine further comprising a support surface upon which the material is built up located in a gaseous environment, and at least one of the printing head and the support surface moving relative to the other to create each layer with a movement pass.

19. The method of claim 13, wherein the material is a three-dimensionally printable polymer, further comprising curing the fastener with light as the fastener is being built up.

20. The method of claim 16, wherein the building-up of the fastener further comprises creating a grommet with the bore therein and creating the legs extended from the grommet by additively depositing multiple layers of the material upon each other in a gaseous environment inside the machine, the legs being flexible and including barbed structures.

21. The method of claim 20, further comprising creating a laterally enlarged flange and an enlarged tapered end with the shaft between, by additively depositing multiple layers of the material upon each other in a gaseous environment inside the machine.

22. The method of claim 16, wherein the emitting step is conducted in air within the machine and the material is a liquid polymer.

23. The method of claim 16, further comprising creating a flexible umbrella between a laterally enlarged head and the shaft by additively depositing multiple layers of the material upon each other.

24. The method of claim 1, further comprising creating a flexible weatherstrip integrally attached to the fastener, as part of the depositing steps.

25. The method of claim 1, further comprising flowing the material from a machine head positioned above a surface of the machine, which is a three-dimensional printing machine, supporting the first layer, at least one of the machine head and the support surface automatically moving relative to the other according to computer instructions in order to create identical multiples of the fastener in the same machine cycle, free of contraction or expansion due to manufacture thereof.

26. The method of claim 1, wherein the material is a polymeric string emitted from a moveable machine head in a continuous manner from a spool which supplies the string to the head.

27. The method of claim 1, further comprising making a predetermined hollow space entirely encapsulated within a section of the fastener.

28. The method of claim 13, further comprising making a predetermined hollow space entirely encapsulated within a section of the fastener.

29. The method of claim 13, wherein at least ten of the fasteners are substantially simultaneously manufactured in a single machine cycle in less than ninety minutes.

30. The method of claim 13, wherein the emitting the material from the ink jet printing head includes flowing the material from openings arranged in an array such that multiple material flows are simultaneously occurring for each layer of the fastener.

31. The method of claim 13, further comprising three-dimensional printing a second member substantially simultaneously with the creation of the fastener in an assembled state such that post-curing assembly is not required, and the second member being moveable relative to a remainder of the fastener after removal of the fastener from the machine.

32. The method of claim 13, further comprising simultaneously creating a resilient segment integral with the fastener head by depositing a layer of a second and more flexible material adjacent a more rigid material defining the fastener head.

* * * * *